United States Patent
Kim et al.

(10) Patent No.: US 12,191,444 B2
(45) Date of Patent: Jan. 7, 2025

(54) ALL-SOLID SECONDARY BATTERY AND METHOD OF MANUFACTURING THE SAME

(71) Applicants: Samsung Electronics Co., Ltd., Suwon-si (KR); CORNING INCORPORATED, Corning, NY (US)

(72) Inventors: Jusik Kim, Hwaseong-si (KR); Myungjin Lee, Seoul (KR); Sewon Kim, Suwon-si (KR); Michael Edward Badding, Campbell, NY (US); Jaemyung Chang, Ansan-si (KR); Zhen Song, Painted Post, NY (US)

(73) Assignees: SAMSUNG ELECTRONICS CO., LTD., Gyeonggi-Do (KR); CORNING INCORPORATED, Corning, NY (US)

( * ) Notice: Subject to any disclaimer, the term of this patent is extended or adjusted under 35 U.S.C. 154(b) by 304 days.

(21) Appl. No.: 17/376,243

(22) Filed: Jul. 15, 2021

(65) Prior Publication Data
US 2022/0045354 A1  Feb. 10, 2022

Related U.S. Application Data

(60) Provisional application No. 63/061,853, filed on Aug. 6, 2020.

(30) Foreign Application Priority Data

Mar. 18, 2021 (KR) .................. 10-2021-0035344

(51) Int. Cl.
*H01M 10/0562* (2010.01)
*H01M 4/02* (2006.01)
(Continued)

(52) U.S. Cl.
CPC ..... *H01M 10/0562* (2013.01); *H01M 4/0407* (2013.01); *H01M 4/133* (2013.01);
(Continued)

(58) Field of Classification Search
CPC .......... H01M 10/0562; H01M 4/0407; H01M 4/133; H01M 4/134; H01M 4/1393;
(Continued)

(56) References Cited

U.S. PATENT DOCUMENTS

| 10,535,868 B2 | 1/2020 | Li et al. |
| 2009/0226816 A1* | 9/2009 | Yoshida ................ C04B 35/447 264/610 |

(Continued)

FOREIGN PATENT DOCUMENTS

| JP | 5375545 B2 | 10/2013 |
| JP | 6432113 B2 | 11/2018 |

(Continued)

OTHER PUBLICATIONS

Machine translation of KR-20180031949-A (Year: 2018).*
(Continued)

*Primary Examiner* — Jonathan G Leong
*Assistant Examiner* — Katharine A Caughron
(74) *Attorney, Agent, or Firm* — CANTOR COLBURN LLP

(57) ABSTRACT

An all-solid secondary battery including: a cathode layer including a cathode active material layer; an anode layer; and a solid electrolyte layer between the cathode layer and the anode layer, and the solid electrolyte layer including a solid electrolyte, wherein the anode layer includes an anode current collector, a first anode active material layer in contact with the solid electrolyte layer, and a second anode active material layer between the anode current collector and the first anode active material layer, wherein the first anode active material layer is a lithium-containing first metal layer, wherein the second anode active material layer includes a carbon-containing anode active material or a carbon-containing anode active material and a second metal, and
(Continued)

wherein a surface of the solid electrolyte layer adjacent to the first anode active material layer has a porosity of 40 percent or less.

29 Claims, 27 Drawing Sheets

(51) Int. Cl.
| | |
|---|---|
| H01M 4/04 | (2006.01) |
| H01M 4/133 | (2010.01) |
| H01M 4/134 | (2010.01) |
| H01M 4/1393 | (2010.01) |
| H01M 4/1395 | (2010.01) |
| H01M 4/36 | (2006.01) |
| H01M 4/40 | (2006.01) |
| H01M 4/505 | (2010.01) |
| H01M 4/525 | (2010.01) |
| H01M 4/583 | (2010.01) |
| H01M 10/0525 | (2010.01) |

(52) U.S. Cl.
CPC ......... *H01M 4/134* (2013.01); *H01M 4/1393* (2013.01); *H01M 4/1395* (2013.01); *H01M 4/366* (2013.01); *H01M 4/405* (2013.01); *H01M 4/505* (2013.01); *H01M 4/525* (2013.01); *H01M 4/583* (2013.01); *H01M 10/0525* (2013.01); *H01M 2004/021* (2013.01); *H01M 2300/0071* (2013.01)

(58) Field of Classification Search
CPC .... H01M 4/1395; H01M 4/366; H01M 4/405; H01M 4/583
See application file for complete search history.

(56) References Cited

U.S. PATENT DOCUMENTS

| | | | | |
|---|---|---|---|---|
| 2015/0099190 | A1* | 4/2015 | Holme | .................. C04B 35/64 |
| | | | | 429/322 |
| 2015/0118574 | A1* | 4/2015 | Visbal | .................. H01M 4/62 |
| | | | | 429/304 |
| 2016/0149260 | A1* | 5/2016 | Badding | ............... H01M 12/08 |
| | | | | 429/405 |
| 2016/0351910 | A1 | 12/2016 | Albano et al. | |
| 2017/0301949 | A1* | 10/2017 | Mimura | ................ H01M 4/602 |
| 2018/0205112 | A1 | 7/2018 | Thomas-Alyea et al. | |
| 2019/0088986 | A1* | 3/2019 | Hu | ..................... H01M 10/054 |
| 2019/0157723 | A1 | 5/2019 | Suzuki et al. | |
| 2020/0075960 | A1* | 3/2020 | Wachsman | .............. H01M 4/38 |
| 2020/0083562 | A1* | 3/2020 | Kim | ..................... H01M 4/382 |
| 2020/0136178 | A1 | 4/2020 | Ku et al. | |
| 2020/0152977 | A1* | 5/2020 | Ohta | .................. H01M 4/0471 |
| 2020/0328469 | A1* | 10/2020 | Asano | .................... H01M 4/62 |
| 2021/0005926 | A1 | 1/2021 | Holme et al. | |
| 2021/0257606 | A1 | 8/2021 | Kim et al. | |
| 2021/0257658 | A1 | 8/2021 | Wachsman et al. | |

FOREIGN PATENT DOCUMENTS

| | | | | |
|---|---|---|---|---|
| JP | 2019500737 A | | 1/2019 | |
| KR | 101405755 B1 | | 6/2014 | |
| KR | 1020150125936 A | | 11/2015 | |
| KR | 1020160065133 A | | 6/2016 | |
| KR | 1020170023298 A | | 3/2017 | |
| KR | 1020180011207 A | | 1/2018 | |
| KR | 20180031949 A | * | 3/2018 | .......... H01M 10/052 |
| KR | 1020200050005 A | | 5/2020 | |
| WO | WO-2015146315 A1 | * | 10/2015 | ........ H01M 10/0525 |

OTHER PUBLICATIONS

PCT International Search Report for PCT/KR2021/010237 dated Nov. 11, 2021.

Abouzari-Lotf et al, "Highly durable polybenzimidazole composite membranes with phosphonated graphene oxide for high temperature polymer electrolyte membrane fuel cells", Journal of Power Sources, 412, 2019, 238-245.

Zhu et al., "Dopant-Dependent Stability of Garnet Solid Electrolyte Interfaces with Lithium Metal", Advanced Energy Materials, 2019, 1803440.

* cited by examiner

ALL-SOLID SECONDARY BATTERY AND METHOD OF MANUFACTURING THE SAME

CROSS-REFERENCE TO RELATED APPLICATION

This application is based on and claims priority to U.S. provisional patent Application No. 63/061,853, filed on Aug. 6, 2020, and Korean Patent Application No. 10-2021-0035344 filed on Mar. 18, 2021, and all the benefits accruing therefrom under 35 U.S.C. § 119, the contents of which are incorporated herein by reference in their entirety.

BACKGROUND

1. Field

The present disclosure relates to an all-solid secondary battery and methods of manufacturing the all-solid secondary battery.

2. Description of Related Art

In response to industrial demand, batteries having both high energy density and safety have been actively developed. For example, lithium-ion batteries are being used as energy sources not only in the fields of information-related and communication devices, but also in the automotive field. In the automotive field, battery safety is especially important due to its potential impact on human life.

A commercialized lithium-ion battery includes a liquid electrolyte including a flammable organic solvent, and as a result, there is a risk of overheating and fire when a short circuit occurs. In this regard, there is a need for an all-solid battery including a solid electrolyte instead of a liquid electrolyte.

SUMMARY

Provided is an all-solid secondary battery having improved lifetime characteristics by including a multi-layered electrode.

Provided is a method of manufacturing the all-solid secondary battery.

Additional aspects will be set forth in part in the description which follows and, in part, will be apparent from the description, or may be learned by practice of the presented embodiments of the disclosure.

According to an aspect, an all-solid secondary battery includes:
a cathode layer including a cathode active material layer;
an anode layer; and
a solid electrolyte layer between the cathode layer and the anode layer, the solid electrolyte layer including a solid electrolyte,
wherein the anode layer includes
an anode current collector,
a first anode active material layer in contact with the solid electrolyte layer, and
a second anode active material layer between the anode current collector and the first anode active material layer,
wherein the first anode active material layer is a lithium-containing first metal layer including lithium and a first metal,
wherein the second anode active material layer includes a carbon-containing anode active material, or a carbon-containing anode active material and a second metal, and
wherein a surface of the solid electrolyte layer adjacent to the first anode active material layer has a surface porosity of 40% or less, and the first metal of the lithium-containing first metal layer is present in a pore of the surface of the solid electrolyte layer.

According to an aspect of another embodiment, a method of manufacturing an all-solid secondary battery includes:
providing a solid electrolyte layer,
disposing a first composition including a first metal salt, a C1 to C10 aliphatic aldehyde, and sodium hydroxide on a first surface of the solid electrolyte layer to form a first metal layer;
heat-treating the first metal layer at about 100° C. to about 600° C. to form a first anode active material layer,
coating a second composition on the first anode active material layer, wherein the second composition includes a carbon-containing anode compound or a carbon-containing anode compound and a second metal; and
drying the second composition to form a second anode active material layer including the carbon-containing anode compound or the carbon-containing anode compound and the second metal;
providing an anode current collector on the second anode active material layer to prepare an anode layer; and
providing a cathode active material layer and a cathode current collector on an opposite second surface of the solid electrolyte layer to prepare a cathode layer on the solid electrolyte layer and manufacture the all-solid secondary battery.

According to an aspect, an all-solid secondary battery includes:
a cathode layer including a cathode active material layer;
an anode layer; and
a solid electrolyte layer between the cathode layer and the anode layer, and including a solid electrolyte,
wherein the anode layer includes
an anode current collector,
a first anode active material layer in contact with the solid electrolyte layer, and
a second anode active material layer between the anode current collector and the first anode active material layer,
wherein the first anode active material layer is a lithium-containing first metal layer,
wherein the second anode active material layer includes a carbon-containing anode active material or a carbon-containing anode active material and a second metal, and
wherein the first metal in the first anode active material layer is uniformly dispersed on an upper surface of the solid electrolyte layer, and the first metal has a particle size of about 10 nanometers (nm) to about 900 nm.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
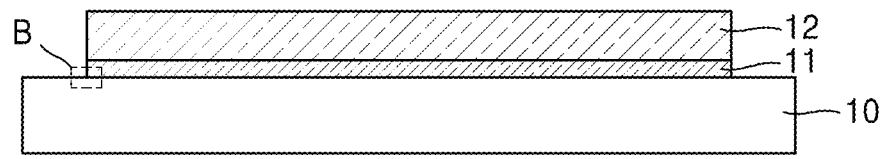
FIG. 1A is a schematic cross-sectional view illustrating an embodiment of a structure of a solid electrolyte layer/a first anode active material layer/a second anode active material layer laminate.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

As used herein, the term "and/or" includes any and all combinations of one or more of the associated listed items. Expressions such as "at least one of," when preceding a list of elements, modify the entire list of elements and do not modify the individual elements of the list.

The terminology used herein is for the purpose of describing particular aspects only and is not intended to be limiting. As used herein, "a," "an," "the," and "at least one" do not denote a limitation of quantity, and are intended to cover both the singular and plural, unless the context clearly indicates otherwise. For example, "an element" has the same meaning as "at least one element," unless the context clearly indicates otherwise. As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element's as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

An all-solid battery does not include a flammable organic solvent, and thus has a reduced risk of fire or explosion even when a short-circuit occurs. Accordingly, the all-solid battery may have increased safety as compared with a lithium-ion battery using a liquid electrolyte.

As used herein an "aliphatic group" means a saturated or unsaturated linear or branched hydrocarbon group. An aliphatic group may be a C1 to C10 alkyl, a C2 to C10 alkenyl, or a C2 to C10 alkynyl group, for example.

As used herein, an aldehyde refers to a compound including an aldehyde group (—C(=O)H). An aliphatic aldehyde refers to a saturated or unsaturated linear or branched hydrocarbon compound without an aromatic ring, and including an aldehyde group.

As used herein, the term "metal" refers to metallic or metalloid elements as defined in the Periodic Table of Elements selected from Groups 1 to 17, including the lanthanide elements and the actinide elements.

Since an all-solid battery does not utilize a flammable organic solvent, the possibility of fire or an explosion may be greatly reduced even when a short circuit occurs. Accordingly, the safety of an all-solid secondary battery may be greatly increased as compared with a lithium-ion battery.

As used herein, "composite" refers to a material formed by combining two or more materials having different physical and/or chemical properties, wherein the composite has properties different from each material constituting the composite, and wherein particles or wires of each material are at least microscopically separated and distinguishable from each other in a finished structure of the composite.

Hereinafter, an all-solid secondary battery and a methods of manufacturing the all-solid secondary battery will be described in detail.

An all-solid secondary battery includes a cathode layer including a cathode active material layer; an anode layer; and a solid electrolyte layer between the cathode layer and the anode layer, the solid electrolyte layer including a solid electrolyte, wherein the anode layer includes an anode current collector, a first anode active material layer in contact with the solid electrolyte layer, and a second anode active material layer between the anode current collector and the first anode active material layer, wherein the first anode active material layer is a lithium-containing first metal layer including lithium and a first metal, the second anode active material layer includes a carbon-containing (i.e., carbon-based) anode active material or a carbon-based anode active material and a second metal, and the solid electrolyte layer adjacent to the first anode active material layer has a surface porosity of 40% or less, and the first metal of the lithium-containing first metal layer is present in a pore of the surface of the solid electrolyte layer.

The solid electrolyte layer adjacent to the first anode active material layer has a surface porosity of about 0.1% to about 40%.

The surface of the solid electrolyte layer extends about 1% to about 50% of the total thickness of the solid electrolyte layer inward from the outermost surface of the solid electrolyte layer. In an aspect, the surface of the solid electrolyte layer adjacent to the first anode active material layer extends a distance of about 1 micrometer (μm) or less, about 900 nm or less, or about 100 nm or less, or about 0.1 nm to about 1 μm, or about 0.1 nm to about 900 nm, or about 0.1 nm to about 500 nm, or about 0.1 nm to about 300 nm from the outermost surface of the solid electrolyte layer.

In the first anode active material layer, the first metal is uniformly dispersed in the upper portion of the surface of the solid electrolyte layer. Herein, "uniform" or "uniformly" refer to a continuous and even distribution of a material (e.g., first metal) in or on the surface of the solid electrolyte. The term is in contrast to a discontinuous distribution of a material in which an interval or gap is present.

The first metal has a particle size of about 10 nm to about 900 nm, or about 10 nm to about 750 nm, or about 20 nm to about 500 nm. Here, the term "a particle size" denotes D50.

It may be observed through scanning electron microscopy (SEM)/energy dispersive X-ray (EDX) analysis that the first metal is uniformly dispersed on and/or in the upper part of the solid electrolyte layer, e.g., on a surface of the solid electrolyte adjacent the first anode active material layer. Further, the particle size of the first metal may be measured using a scanning electron microscope, a particle size analyzer, a laser particle size distribution system, or the like.

In this specification, the particle size refers to a diameter when the particle is spherical, and refers to a length of a major axis when the particle is non-spherical. For example, the particle size of the first metal may be a median diameter (D50) or "D50 particle size" as measured using a laser particle size distribution meter. A median diameter or D50 particle size refers to a particle diameter corresponding to 50% of the particles in a cumulative distribution curve in which particles are accumulated in the order of particle diameter from the smallest particle to the largest particle, and a total number of accumulated particles is 100%.

In an all-solid secondary battery in the art which includes a solid electrolyte, lithium is locally deposited at the interface between the solid electrolyte layer and the anode electrode layer. As the lithium deposit grows, the grown lithium in the deposit penetrates the solid electrolyte layer, and thus a short circuit of the battery may occur. Further, since the solid electrolyte layer and the cathode layer are simply laminated, the effective interface area between the solid electrolyte layer and the anode layer is less than the actual contact area therebetween. Accordingly, the interfacial resistance increases at the interface between the solid electrolyte layer and the anode layer, the internal resistance of the battery increases, and the cycle characteristics of the battery deteriorate.

Thus, in order to solve the above mentioned problem, a lithium-containing first metal layer including lithium and without containing a carbon-based anode compound, was formed on the solid electrolyte layer as a first anode active material layer. A second anode active material layer containing a carbon-containing (carbon-based) anode active material or containing a second metal and a carbon-based anode active material, is formed on the lithium-containing first metal layer.

The lithium-containing first metal layer (first anode active material layer) may be prepared by forming a first metal layer on a surface of the solid electrolyte layer. The first metal layer may be formed by disposing a composition including a first metal salt, a C1 to C10 aliphatic aldehyde, and sodium hydroxide on a surface of the solid electrolyte layer, and then heat-treating the first metal layer at a temperature of about 100° C. to about 600° C., for example, about 100° C. to about 450° C., or about 200° C. to about 450° C. to form the first anode active material layer. Through this process, a lithium-first metal alloy layer (also referred to herein as a lithium-first metal interlayer), thermally bonded to the electrolyte by heat treatment, may be formed in an area of the first anode active material layer, which is directly adjacent to the surface of the solid electrolyte layer, and the first metal layer may be in an the area of the first anode active material layer which is not directly adjacent to the solid electrolyte layer. The lithium-containing first metal layer thus includes the lithium-first metal alloy layer and the first metal layer, which are substantially difficult to distinguish. According to an embodiment, the first metal is silver (Ag), the lithium-first metal alloy layer is a lithium-silver (Li—Ag) alloy layer, and the first metal layer is a silver (Ag) layer.

When the first metal layer is subjected to heat treatment to form the lithium-containing first metal layer according to an embodiment, the first metal layer does not contain a carbon-based anode compound, and as a result, depletion of the lithium interface (lithium depletion layer) due to a reaction between carbon and lithium carbonate ($Li_2CO_3$) on the surface of the solid electrolyte during heat treatment, may be prevented.

In the solid electrolyte layer/silver layer structure or the solid electrolyte layer/carbon-based material and silver-containing structure, heat treatment may form a lithium depletion layer thereby causing a problem of large interfacial resistance at room temperature. In contrast, in the disclosed all-solid secondary battery according to an embodiment, in which thermal bonding between the sold electrolyte layer and the first anode active material layer is increased to reduce the interfacial resistance, and the first metal is dispersed in the solid electrolyte layer toward the current collector, the uniformity of the current during charge and discharge of the battery is improved.

Referring to FIG. 1A, a lithium-containing first metal layer 11, which is also referred to as a first anode active material layer, is disposed on a solid electrolyte layer 10, and a second anode active material layer 12 containing a carbon-based anode compound or containing a carbon-based anode active material and a second metal is disposed on the lithium-containing first metal layer 11.

The first metal comprises indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), zinc (Zn), or a combination thereof. For example, silver (Ag) may be used as the first metal.

A thermally bonded Li-first metal interlayer is disposed in an area of the first anode active material layer which is adjacent to the solid electrolyte layer. The thermally bonded Li-first metal interlayer has a thickness of 7 μμm or less, 6 μm or less, or for example, about 5 μm to about 7 μm.

According to an embodiment, the atomic ratio of lithium to the first metal in the lithium-containing first metal layer 11 is about 0.01:1 to about 10:1, for example, about 0.05:1 to about 10:1, or about 1:1 to about 10:1.

According to another embodiment, in the thermally bonded Li-first metal interlayer of the lithium-containing first metal layer 11, lithium (Li) diffuses from the oxide solid electrolyte, and thus, initially, the content of lithium (Li) is greater in the Li-first metal interlayer portion (i.e., adjacent to the solid electrolyte layer) than the lithium content of other areas of the first anode active material layer. However, as lithium diffusion occurs, there is movement of the lithium to other areas of the anode active material layer, and so the content of lithium (Li) in the first anode active material layer may be uniform.

Figure 1B:
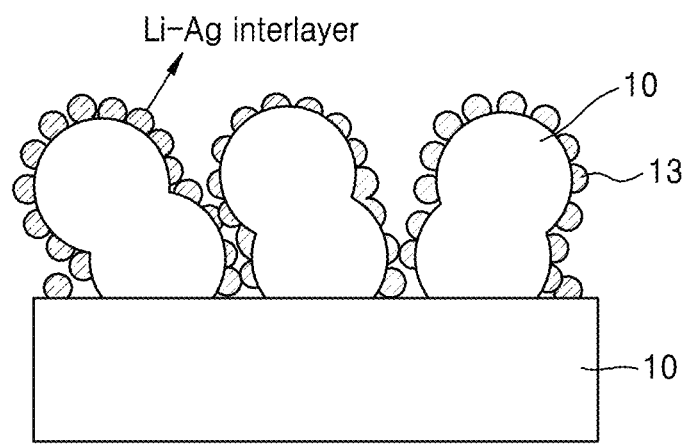
FIG. 1B is an enlarged view of a portion of the laminate shown in FIG. 1A, and showing a portion of a solid electrolyte layer and a portion of a first anode active material layer of the laminate shown in FIG. 1A.

FIG. 1B is an enlarged view of the rectangular dotted area B of the laminate in FIG. 1A. In particular, FIG. 1B shows the lithium-first metal interlayer 13 is disposed in an area of the first anode active material layer 11 which is adjacent to the solid electrolyte layer 10. The lithium-first metal interlayer 13 is, for example, a Li—Ag interlayer. The thickness of the Li—Ag interlayer is, for example, about 5 μm to about 7 μm.

The lithium-first metal interlayer (e.g., Li—Ag interlayer) is composed of, or consists essentially of, or consists of a metal, and does not include a carbon-based anode compound. This lithium-first metal interlayer 13 is obtained by forming a thermal bond between the first metal and the solid electrolyte of the solid electrolyte layer 10. A thermal bond (a result of thermal bonding) refers to herein, for example, a covalent bond (covalent bonding). In particular, a thermal bond between the oxide of the solid electrolyte and the first metal is formed. In the surface of the solid electrolyte layer adjacent to the first anode active material layer, where the surface is an area within 5 μm from the outermost surface or edge of the solid electrolyte layer, the amount of lithium is non-stoichiometrically controlled, so that the interfacial stability and room temperature interfacial reaction kinetics of the solid electrolyte layer and the first anode active material layer are improved.

The solid electrolyte layer includes, for example, an oxide-containing (oxide-based) solid electrolyte.

The oxide-based solid electrolyte includes, for example, $Li_{1+x+y}Al_xTi_{2-x}Si_yP_{3-y}O_{12}$ (0<x<2, 0≤y<3), $BaTiO_3$, $Pb(Zr_aTi_{1-a})O_3$ (where 0≤a≤1) (PZT), $Pb_{1-x}La_xZr_{1-y}Ti_yO_3$ (where 0≤x<1, 0≤y<1) (PLZT), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (where 0<x<2, 0<y<3), $Li_xAl_yTi_z(PO_4)_3$ (where 0<x<2, 0<y<1, 0<z<3), $Li_{1+x+y}(Al_aGa_{1-a})_x(Ti_bGe_{1-b})_{2-x}Si_yP_{3-y}O_{12}$ (where 0≤x≤1, 0≤y≤1, 0≤a≤1, 0≤b≤1), $Li_xLa_yTiO_3$ (where 0<x<2, 0<y<3), $Li_2O$, $LiOH$, $Li_2CO_3$, $LiAlO_2$, $Li_2O$—$Al_2O_3$—$SiO_2$—$P_2O_5$—$TiO_2$—$GeO_2$, $Li_{3+x}La_3M_2O_{12}$ (where M is Te, Nb, or Zr, and 0≤x≤10), or a combination thereof.

The oxide-based solid electrolyte includes, for example, a garnet-type solid electrolyte selected from $Li_7La_3Zr_2O_{12}$ (LLZO) and $Li_{3+x}La_3Zr_{2-a}M_aO_{12}$ (M doped LLZO, where M is Ga, W, Nb, Ta, or Al, x is 0≤x≤10, and 0.05≤a≤0.7).

According to an embodiment, the solid electrolyte layer includes an LLZO solid electrolyte.

The solid electrolyte layer may include, for example, $Li_7La_3Zr_2O_{12}$ (LLZO), $Li_{6.4}La_3Zr_{1.7}W_{0.3}O_{12}$, $Li_{6.5}La_3Zr_{1.5}Ta_{0.3}O_{12}$, $Li_7La_3Zr_{1.7}W_{0.3}O_{12}$, $Li_{4.9}La_{2.5}Ca_{0.5}Zr_{1.7}Nb_{0.3}O_{12}$, $Li_{4.9}Ga_{2.1}La_3Zr_{1.7}W_{0.3}O_{12}$, $Li_{6.4}La_3Zr_{1.7}W_{0.3}O_{12}$, $Li_7La_3Zr_{1.5}W_{0.5}O_{12}$, $Li_7La_{2.75}Ca_{0.25}Zr_{1.75}Nb_{0.25}O_{12}$, $Li_7La_3Zr_{1.5}Nb_{0.5}O_{12}$, $Li_7La_3Zr_{1.5}Ta_{0.5}O_{12}$, $Li_{6.272}La_3Zr_{1.7}W_{0.3}O_{12}$, $Li_{5.39}Ga_{1.61}La_3Zr_{1.7}W_{0.3}O_{12}$, $Li_{6.5}La_3Zr_{1.5}Ta_{0.3}O_{12}$, or a combination thereof.

As shown in FIG. 1B, the solid electrolyte layer has a porous surface and/or a rough surface, which is the result of acid treatment of the solid electrolyte material. When the solid electrolyte layer has a porous and/or rough surface, the bonding force with the first anode active material may be further improved.

The lithium-containing first metal layer may be formed by applying the composition comprising the first metal salt, the C1 to C10 aliphatic aldehyde, and sodium hydroxide on the surface of the solid electrolyte layer by solution infiltration, dipping, spin coating, drop casting, spray coating, spray pyrolysis, roll coating, dip coating, flow coating, a doctor blade method, dispensing, inkjet printing, offset printing, screen printing, pad printing, gravure printing, flexoprinting, or lithoprinting.

According to an embodiment, in the lithium-containing first metal layer, the effective area of the solid electrolyte layer and the lithium-first metal interlayer may be maximized by using a metal precursor solution permeation method on the solid electrolyte layer. When compared to the case where the anode layer is simply laminated on the solid electrolyte layer, the effective interface area between the solid electrolyte layer and the anode layer is increased as compared with the actual contact area through the use of the solution permeation method.

The porous surface of the solid electrolyte layer, which is adjacent to the first anode active material layer, has a porosity of about 40% or less, about 30% or less, about 20% or less, or about 1% to about 40%, about 2% to about 30%, about 1% to about 20%, or about 5% to about 20%, or about 10% to about 20%, and the first metal of the first anode active material layer is present in the pores of the surface of the solid electrolyte layer. As described above, the first metal is dispersed in the surface of the solid electrolyte layer decreasing from the surface toward the current collector, and thus current uniformity may be improved during charge and discharge.

In the case where the anode active material layer is formed on the solid electrolyte layer by sputtering or deposition, when the surface porosity of the solid electrolyte layer is greater than 20%, it is difficult for the first metal of the first anode active material layer to be deposited, and thus be present, in the pores of the surface of the solid electrolyte layer.

According to an embodiment, the porosity may be measured through scanning electron microscope (SEM) analysis.

Hereinafter, a method of manufacturing an all-solid secondary battery according to an embodiment will be described in more detail.

First, surface modification is performed by acid treatment on a first side of the solid electrolyte layer. For acid treatment, an aqueous hydrochloric acid solution, an aqueous sulfuric acid solution, or a combination thereof is used.

When the solid electrolyte layer is subjected to acid treatment, a portion of the inorganic lithium ion conductor constituting the solid electrolyte layer is selectively eluted by the acid to form a pore in the surface of the solid electrolyte layer structure. When the porous structure is formed in this way, lithium carbonate is removed to the sub-surface of the solid electrolyte layer, so that lithium in the lithium ion conductor may be partially substituted. Further, the crystallinity of the solid electrolyte layer is improved, and the average grain size thereof is increased. As a result, a metallic compound potentially capable of causing a short circuit is not formed, and the suppression of current concentration is prevented, thereby minimizing the occurrence of a short circuit at high current density. Further, a protonated inorganic lithium ion conductor is present on the surface of the solid electrolyte layer and the specific surface area thereof is increased, so that the interfacial resistance between the solid electrolyte layer and the anode may be greatly reduced.

The surface of the solid electrolyte layer is protonated by the acid treatment, and thus protons are substituted instead of lithium, so that the content of protons may be about 0.01 mole percent (mol %) to about 50 mol %, for example, about 0.1 mol % to about 20 mol %, or about 1 mol % to about 20 mol %, based on a total proton and lithium content of the solid electrolyte layer.

The lithium-containing first metal layer, which is a first anode active material layer, is formed on the surface-modified solid electrolyte layer by applying a composition containing a first metal salt, a C1 to C10 aliphatic aldehyde, and sodium hydroxide on the acid-treated surface of the surface-modified solid electrolyte layer.

The first anode active material layer is formed using the composition. The first anode active material layer is formed on a single surface of the solid electrolyte layer by applying the composition onto the surface of the solid electrolyte layer through solution infiltration, dipping, spin coating, drop casting, spray coating, spray pyrolysis, roll coating, dip coating, flow coating, a doctor blade method, dispensing, inkjet printing, offset printing, screen printing, pad printing, gravure printing, flexoprinting, or lithoprinting. In an aspect, the process of forming the first anode active material layer using the composition may be performed through solution infiltration or spray coating.

The first metal salt is a metal salt including indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), palladium (Pd), silver (Ag), zinc (Zn), or a combination thereof. The first metal salt is, for example, a metal salt including silver, and in particular, may be silver nitrate.

The C1 to C10 aliphatic aldehyde may be, for example, formaldehyde, acetaldehyde, or a combination thereof.

The amounts of the first metal salt, the C1 to C10 aliphatic aldehyde, and the sodium hydroxide are stoichiometrically controlled so as to obtain the first metal layer.

The first metal layer is obtained by a Tollen's reaction. The Tollen's reaction is illustration in Reaction Formula 1 below, using a mixture including silver nitrate, formaldehyde, and sodium hydroxide.

Reaction Formula 1

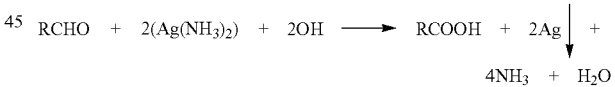

$$RCHO + 2(Ag(NH_3)_2) + 2OH \longrightarrow RCOOH + 2Ag\downarrow + 4NH_3 + H_2O$$

Subsequently, the first anode active material layer is heat-treated at about 100° C. to about 600° C., about 100° C. to about 450° C., for example, about 300° C. to about 450° C.

The heat treatment time may be about 0.1 hours to about 20 hours, about 0.5 hours to about 15 hours, about 1 hour to about 10 hours, about 1 hour to about 5 hours, or about 1 hour to about 3 hours, but is not necessarily limited to these ranges, and may be adjusted depending on the specific reaction conditions. The atmosphere for the heat treatment may be an inert atmosphere. Argon, nitrogen, or the like may be used as the inert gas.

When the heat treatment temperature is within the above-described ranges, the bonding strength of the first cathode active material layer to the solid electrolyte layer is improved. Further, due to the heat treatment, a lithium-first metal interlayer (including a lithium-first metal alloy, formed by a thermal bond) is formed in an area of first anode active material layer, which is adjacent to the solid electrolyte layer. Further, as the number of thermal bonds between the first anode active material layer and the solid electrolyte layer increases, a stable interface may be maintained during charge/discharge driving. Even at high current density, it is possible to form a short circuit through the inside of the solid electrolyte layer by preventing lithium from being locally deposited in a specific area. In addition, it is possible to obtain an effect of reducing charge transfer resistance by minimizing the formation of a lithium depletion layer through heat treatment at a temperature of 600° C. or less.

The heat-treated product is subjected to a cleaning process using an acid solution.

As the acid solution, a hydrochloric acid solution is used, and the concentration of the hydrochloric acid solution is about 0.5 molar (M) to about 2M. The surface-cleaned, heat-treated product is coated with a composition containing a carbon-based anode compound or a composition containing a carbon-based anode compound and a second metal, and dried to form a second anode active material layer on the first anode active material layer.

The carbon-based anode compound includes a nano-sized carbon particle having a particle diameter on a nanoscale level, and thus lithium absorption/desorption occurs uniformly inside the anode. Accordingly, the anode layer including the first anode active material layer and the second anode active material layer, and which is disposed on the solid electrolyte layer, provides long-term lifetime characteristics.

A cathode active material layer may be disposed on the other surface of the solid electrolyte layer, i.e., the surface opposite the anode layer, to manufacture an all-solid secondary battery.

In the solid electrolyte layer adjacent to the first anode active material layer, the amount of lithium in the area within a distance of about 5 μm from the outermost surface of the solid electrolyte layer is depleted by about 1 atomic percent (at %) to about 30 at %, about 5 at % to about 20 at %, or about 10 at % to about 15 at %, based on the total lithium content of the solid electrolyte layer.

A third metal is also present in an area of the first anode active material layer, which is adjacent to the solid electrolyte layer Here, the content of the third metal is about 30 at % or less, or about 20 at % or less, or about 10 at % or less, for example, about 0.1 at % to about 30 at %, or about 0.1 at % to about 25 at %, or about 1 at % to about 20 at %.

The third metal may be derived from a compound constituting the solid electrolyte. The third metal includes lanthanum (La), zirconium (Zr), tantalum (Ta), or a combination thereof.

In the area of the first anode active material layer, which is adjacent to the solid electrolyte layer, a thermal bond between the oxide of the solid electrolyte and the first metal of the first anode active material layer may be formed when the solid electrolyte is an oxide-based solid electrolyte. As a result, oxygen may be further included in the area of the first anode active material layer, which is adjacent to the solid electrolyte layer.

Referring to FIGS. 10 to 13, an all-solid secondary battery 91 includes a cathode layer 910 including a cathode active material layer 912, an anode layer 920, and a solid electrolyte layer 930 disposed between the anode layer and the cathode layer and including a solid electrolyte. The anode layer 920 includes an anode current collector 921, a first anode active material layer 922 disposed on the anode current collector and in contact with the solid electrolyte layer 930, and a second anode active material layer 923 disposed between the anode current collector 921 and the first anode active material layer 922. The first anode active material layer 922 is a lithium-containing first metal layer, and the second anode active material layer includes a carbon-based anode active material or a carbon-based anode active material and a second metal.

The second metal is the same as or different from the first metal, and includes indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), zinc (Zn), or a combination thereof.

Anode Layer

Figure 10:
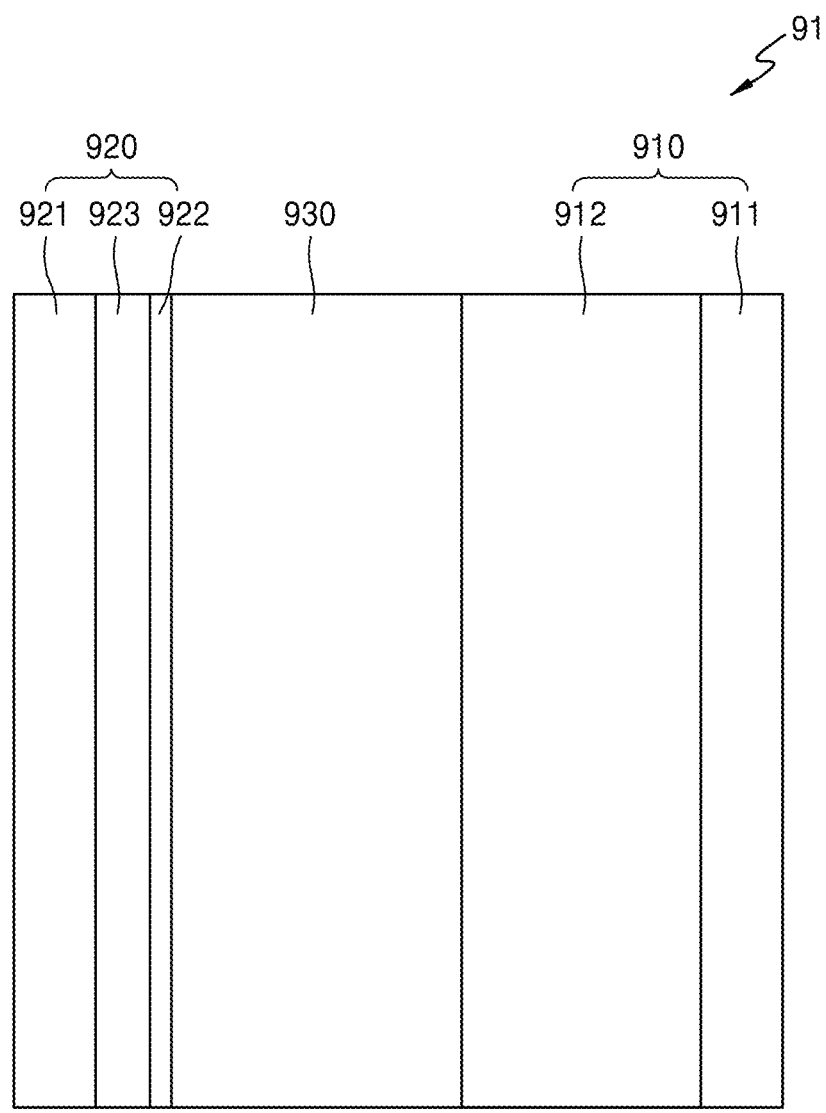
FIG. 10 is a cross-sectional view of an embodiment of an all-solid secondary battery.

Referring to FIG. 10, a second anode active material layer 923 and a first anode active material layer 922 are formed on an anode current collector 921.

The first anode active material layer 922 does not contain a carbon-based anode active material, and contains lithium and a first metal. The mixed atomic ratio of lithium to the first metal is about 0.5:1 to about 0.8:1, for example, about 0.65:1 to about 0.7:1.

The carbon-based anode active material contained in the second anode active material layer 923 has a nanosized particle shape. The average particle diameter or particle size of the carbon-based anode active material having a particle shape is 5 μm or less, for example, 4 μm or less, 2 μm or less, 1 μm or less, or 900 nm or less. The average particle diameter of the carbon-based anode active material is, for example, about 10 nm to about 4 μm, about 10 nm to about 2 μm, about 10 nm to about 1 μm, or about 10 nm to about 900 num. When the average particle diameter of the carbon-based anode active material is within the above ranges, during charge and discharge, reversible absorption and/or desorption of lithium may be more easily performed. The average particle diameter or average particle size of the carbon-based anode active material is, for example, a median diameter (D50) measured using a laser particle size distribution meter. Alternatively, the average particle diameter of the carbon-based cathode active material is an arithmetic average value of particle sizes obtained from a scanning electron microscope image.

The carbon-based anode active material in the second anode active material layer 923 includes, for example, amorphous carbon. Examples of amorphous carbon may include, but are not limited to, carbon black (CB), acetylene black (AB), furnace black (FB), ketjen black (KB), graphene, carbon nanotube, carbon nanofiber, or a combination thereof. Any amorphous carbon may be used as long as it is classified as amorphous carbon in the art.

The second anode active material layer 923 may further include a second metal in addition to the carbon-based anode active material. The first anode active material layer 922 may further include a second metal in addition to the first metal. When the second negative electrode active material layer 923 includes a carbon-based anode active material and a second metal, this should be interpreted as containing a mixture of a carbon-based anode active material and a second metal, or a composite of a carbon-based anode active material and a second metal. Here, a composite is not a simple mixture of a first particle and a second particle, or a mixture thereof physically bound together by a binder, but to the contrary, is a product obtained by thermochemically reacting the components together through the use of heat treatment or a product obtained by mechanochemically reacting the components together by mechanical milling.

The carbon-based anode active material is, for example, an amorphous carbon.

The composite of the carbon-based anode active material and the second metal is, for example, a composite of amorphous carbon and silver, and the mixed weight ratio of carbon to silver is, for example, about 10:1 to about 1:2, about 5:1 to about 1:1, or about 4:1 to about 2:1, but is not necessarily limited to these ranges, and is selected depending on the desired characteristics of the all-solid secondary battery 91. Since the second anode active material layer 923 has such a composition, the cycle characteristics of the all-solid secondary battery 91 are further improved.

The second anode active material included in the second anode active material layer 923 includes, for example, a composite of first particles made of amorphous carbon and second particles made of a second metal. The content of the second particles is about 1 weight percent (wt %) to about 60 wt %, about 8 wt % to about 60 wt %, about 10 wt % to about 50 wt %, about 15 wt % to about 40 wt %, or about 20 wt % to about 30 wt % based on the total weight of the composite. When the content of the second particles is within the above range, for example, the cycle characteristics of the all-solid secondary battery 91 are improved.

The anode active material included in the second anode active material layer 923 includes, for example, a mixture of first particles made of amorphous carbon and second particles made of a metal. The mixture is a simple mixture of the first particles and the second particles, or a mixture thereof physically bonded by a binder.

The content of the second particles is about 8 wt % to about 60 wt %, about 10 wt % to about 50 wt %, about 15 wt % to about 40 wt %, or about 20 wt % to about 30 wt %, based on the total weight of the mixture of first particles and second particles. When the content of the second particles is within the above ranges, for example, cycle characteristics of the all-solid secondary battery 91 are improved.

In the first anode active material layer 922, the first metal forms, for example, a covalent bond and/or an ionic bond with the solid electrolyte included in the solid electrolyte layer 930. The covalent bond and/or ionic bond are the result of the thermal bonding which occurs during the heat treatment of the precursors of the first anode active material layer 922 and the solid electrolyte layer 930. As the first anode active material layer 922 forms covalent bonds with the solid electrolyte layer, the interfacial resistance between the first anode active material layer 922 and the solid electrolyte layer 930 decreases.

The first anode active material layer 922 is, for example, an inorganic layer, and does not include an organic material. The first anode active material layer 922 does not include an organic binder such as, for example, a polymer binder. Therefore, when the first anode active material layer 922 is used, side reactions occurring in the charge/discharge process by an organic material are suppressed.

The first anode active material layer 922 is subjected to a manufacturing process such that only lithium and the first metal remain. In other words, the first anode active material layer 922 consists essentially of, or consists of lithium and the first metal.

The thickness of the first anode active material layer 922 is, for example, about 50% or less, about 40% or less, about 30% or less, about 20% or less, or about 10% or less, or about 1% to about 50%, or about 5% to about 20%, or about 5% to about 10%, of the thickness of the cathode active material layer 910. Since the thickness of the first anode active material layer 922 is thinner than the thickness of the cathode active material layer 910, the energy density of the all-solid secondary battery is improved. The thickness of the first anode active material layer 922 is, for example, about 10 nm to about 10 μm, about 100 nm to about 10 μm, about 300 nm to about 10 μm, about 500 nm to about 10 μm, about 1 μm to about 10 μm, about 1 μm to about 9 μm, or about 3 μm to about 7 μm. When the thickness of the first anode active material layer 922 is within the above ranges, the cycle characteristics of the all-solid secondary battery are improved. When the thickness of the first anode active material layer 922 is within the above ranges, the first anode active material layer 922 may function well as an anode active material layer, the energy density of the all-solid secondary battery 91 is improved, and the internal resistance of the all-solid secondary battery 91 is reduced, thereby improving the cycle characteristics of the all-solid secondary battery.

The thickness of the second anode active material layer 923 is, for example, 50% or less, 30% or less, or 10% or less, or about 1% to about 50%, or about 5% to about 20%, or about 5% to about 10%, of the thickness of the cathode active material layer 910. As the thickness of the second anode active material layer 922 is thinner than the thickness of the cathode active material layer 910, the energy density of the all-solid secondary battery is improved.

The thickness of the second anode active material layer 923 is, for example, about 1 μm to about 50 μm, about 5 μm to about 45 μm, about 10 μm to about 40 μm, about 15 μm to about 35 μm, or about 20 μm to about 30 μm. When the thickness of the second anode active material layer 923 is within the above ranges, the short circuit of the all-solid secondary battery is suppressed, and the cycle characteristics of the all-solid secondary battery are improved. When the second anode active material layer 923 is too thin, lithium dendrites formed between the second anode active material layer 923 and the anode current collector 921 collapses the second anode active material layer 923, thereby making it difficult to improve the cycle characteristics of the all-solid secondary battery 91. When the thickness of the second anode active material layer 923 is within the above ranges, the energy density and cycle characteristics of the all-solid secondary battery 91 are improved.

The thickness of the first anode active material layer 922 is, for example, thinner than the thickness of the second anode active material layer 923. The thickness of the first anode active material layer 922 is 50% or less, 30% or less, or 10% or less, or about 1% to about 50%, or about 5% to about 20%, or about 5% to about 10%, of the thickness of the second anode active material layer 923. When the thickness of the first anode active material layer 922 is within the above ranges, a short circuit in the all-solid secondary battery is suppressed, and the cycle characteristics of the all-solid secondary battery are improved.

The second anode active material layer 923 may further include, for example, a binder. Examples of the binder may include, but are not limited to, styrene-butadiene rubber (SBR), polytetrafluoroethylene, polyvinylidene fluoride, polyethylene, vinylidene fluoride/hexafluoropropylene copolymer, polyacrylonitrile, polymethyl methacrylate, or a combination thereof. Any suitable binder for an all-solid secondary battery may be. The binder may be composed of a single binder or a plurality of different binders.

Since the second anode active material layer 923 includes a binder, the second anode active material layer 923 is stabilized on the anode current collector 921. Further, during the charging and discharging process, cracks in the second anode active material layer 923 are suppressed regardless of a change in volume of the second anode active material layer 923 and/or a change in the relative position of the second anode active material layer 923. For example, when the second anode active material layer 923 does not include a binder, the second anode active material layer 923 may be easily separated from the anode current collector 921. A portion of the second anode active material layer 923 separated from the anode current collector 912 contacts the solid electrolyte layer 930 due to the exposure of the anode current collector 921, thereby increasing a possibility of the occurrence of a short circuit. The second anode active material layer 923 is prepared by applying a slurry, in which a material constituting the second anode active material layer 23 is dispersed, onto the anode current collector 921 and drying the slurry. It is possible to stably disperse the anode active material in the slurry by including the binder in the second anode active material layer 23. For example, when the slurry is applied onto the anode current collector 921 by screen printing, it is possible to prevent the clogging of a screen, for example, clogging of a screen by aggregates of the anode active material.

The anode current collector 921 is made of, for example, a material that does not react with lithium, that is, a material which does not form either an alloy or a compound with lithium. Examples of the material constituting the anode current collector 921 may include, but are not limited to, copper (Cu), stainless steel, titanium (Ti), iron (Fe), cobalt (Co), and nickel (Ni). Any material suitable for use as an electrode current collector may be used. The anode current collector 921 may be made of one of the above-described metals, or may be an alloy of two or more metals or a coating material. The anode current collector 921 may be in the form of a plate shape or a foil shape.

The second anode active material layer 923 may further include an additive such as a filler, a dispersant, an ion conducting agent, or a combination thereof, and which may be any material suitable for use in an all-solid secondary battery 91.

In the all-solid secondary battery 91, for example, the second anode active material layer includes a carbon-based anode active material or a carbon-based anode active material and a second metal, and the first anode active material layer is a lithium-containing first metal layer including lithium and a first metal. Since the all-solid secondary battery 91 has such a structure, the short circuit of the all-solid secondary battery 91 is suppressed, and the cycle characteristics thereof are improved.

Figure 11:
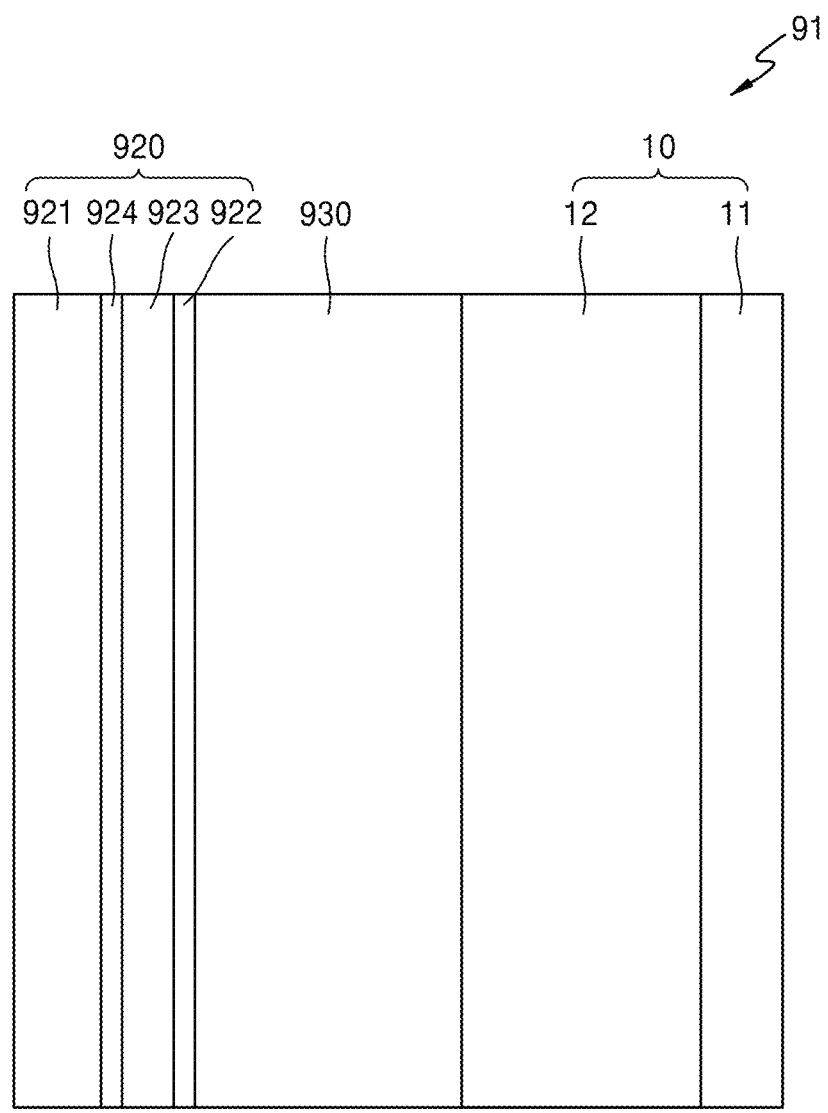
FIGS. 11 to 13 are each a cross-sectional view of an embodiment of an all-solid secondary battery.

Referring to FIG. 11, the all-solid secondary battery 91 further includes a thin film 924 on the anode current collector 921. The thin film 924 is disposed between the anode current collector 921 and the second anode active material layer 923. The thin film 924 includes an element capable of forming an alloy with lithium. Examples of the element capable of forming an alloy with lithium may include, but are not limited to, gold, silver, zinc, tin, indium, silicon, aluminum, bismuth, or a combination thereof. Any element capable forming an alloy with lithium may be used. The thin film 924 is formed of one of these elements (e.g., metals), or is formed of an alloy of several kinds of metals. Since the thin film 924 is disposed on the anode current collector 921, for example, the deposition pattern of a third anode active material layer (not shown) deposited between the thin film 924 and the second anode active material layer 923 may be further flattened, and the cycle characteristics of the all-solid secondary battery 91 may be further improved.

The thickness of the thin film 924 is, for example, about 1 nm to about 800 nm, about 10 nm to about 700 nm, about 50 nm to about 600 nm, or about 100 nm to about 500 nm. When the thickness of the thin film 924 is less than 1 nm, the thin film 924 may not be capable of functioning. When the thickness of the thin film 924 is within the above range, the energy density and cycle characteristics of the all-solid battery are improved. The thin film 924 may be disposed on the anode current collector 921 by a vacuum deposition method, a sputtering method, or a plating method, but is not limited to these methods. Any suitable method may be used as long as it is a method capable of forming the thin film 924.

Figure 12:
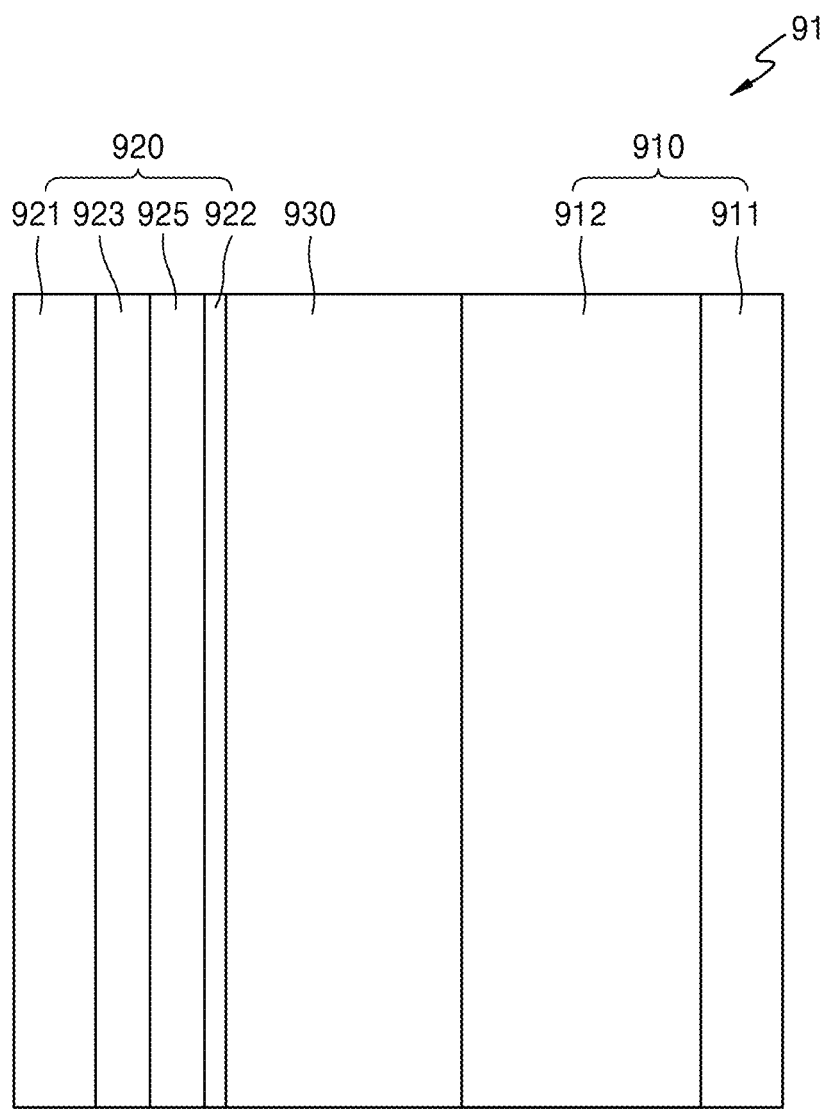
Figure 13:
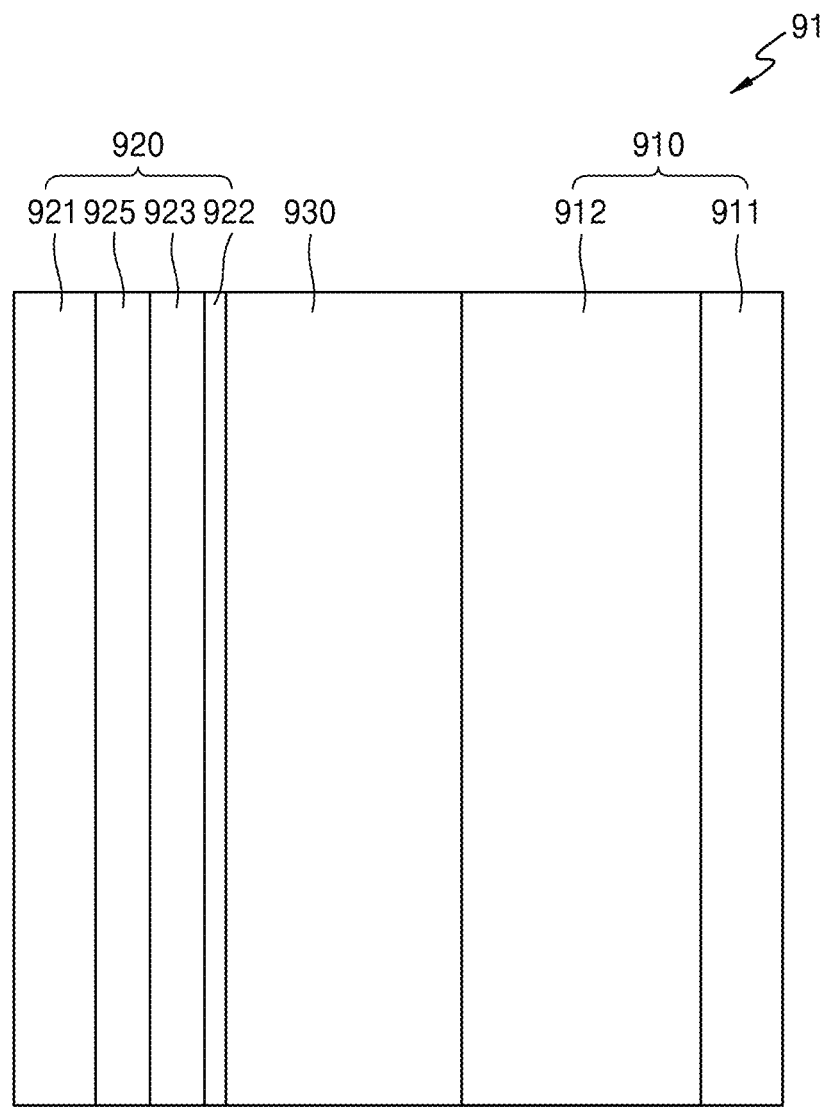

Referring to FIGS. 12 and 13, the all-solid secondary battery 91 further includes a third anode active material layer 925 disposed between the anode current collector 921 and the second anode active material layer 923 (FIG. 13), or between the first anode active material layer 922 and the second anode active material layer 923 (FIG. 12). The third anode active material layer 925 is a metal layer including lithium or a lithium alloy. Accordingly, since the third anode active material layer 925 is a metal layer including lithium, it acts as, for example, a lithium reservoir. Examples of the lithium alloy may include a Li—Al alloy, a Li—Sn alloy, a Li—In alloy, a Li—Ag alloy, a Li—Au alloy, a Li—Zn alloy, a Li—Ge alloy, a Li—Si alloy, or a combination thereof.

The thickness of the third anode active material layer 925 is not particularly limited, but is, for example, about 1 μm to about 1,000 μm, about 1 μm to about 200 μm, about 1 μm to about 100 μm, or about 1 μm to about 50 μm. When the thickness of the third anode active material layer 925 is within the above ranges, the third anode active material layer 925 may effectively function as a lithium reservoir. The third anode active material layer 925 may be, for example, a metal foil having a thickness in these ranges.

In the all-solid secondary battery 91, the third anode active material layer 925 is disposed between the anode current collector 921 and the second anode active material layer 923 or between the first anode active material layer 922 and the second anode active material layer 923 prior to assembly of the all-solid secondary battery 91. Alternatively, in the all-solid secondary battery 91, the third anode active material layer 925 is deposited between the anode current collector 921 and the second anode active material layer 923 or between the first anode active material layer 922 and the second anode active material layer 923 during charge after assembly of the all-solid secondary battery 91.

When the third anode active material layer 925 is disposed between the anode current collector 921 and the second anode active material layer 923, or between the first anode active material layer 922 and the second anode active material layer 923 prior to assembly of the all-solid secondary battery 91, the third anode active material layer 925 act as a lithium reservoir because the third anode active material layer 925 is a metal layer including lithium. The cycle characteristics of the all-solid secondary battery 91 including the third anode active material layer 925 are further improved. For example, a lithium foil is disposed between the anode current collector 921 and the second anode active material layer 923 or between the first anode active material layer 922 and the second anode active material layer 923 prior to assembly of the all-solid secondary battery 91.

When the third anode active material layer 925 is disposed during charge after assembly of the all-solid secondary battery 91, the energy density of the all-solid secondary battery 91 increases because the all-solid secondary battery 91 does not include the third anode active material layer 925 during the assembly of the all-solid secondary battery 91. For example, when the all-solid secondary battery 91 is charged, the first anode active material layer 922 and/or the second anode active material layer 923 is charged so as to exceed the charging capacity thereof. That is, the first anode active material layer 922 and/or the second anode active material layer 923 is overcharged. At the initial stage of charging, lithium is absorbed and stored in the first anode active material layer 922 and/or the second anode active material layer 923. That is, the anode active material included in the first anode active material layer 922 and/or the second anode active material layer 923, forms an alloy or a compound with lithium ions transferred from the cathode layer 910. When the first anode active material layer 922 and/or the second anode active material layer 923 is charged so as to exceed the charging capacity thereof, for example, lithium is precipitated on the rear surface of the second anode active material layer 923, that is, between the anode current collector 921 and the second anode active material layer 923, and a metal layer corresponding to the third anode active material layer 925 may be formed by the precipitated lithium. Alternatively, when the second anode active material layer 923 is charged so as to exceed the charging capacity thereof, for example, lithium is precipitated on the front surface of the second anode active material layer 923, that is, between the first anode active material layer 922 and the second anode active material layer 923, and a metal layer corresponding to the third anode active material layer 925 may be formed by the precipitated lithium.

The third anode active material layer 925 is a metal layer mainly including lithium (that is, lithium metal). This result is obtained, for example, when the anode active material included in the first anode active material layer 922 and the second anode active material layer 923 are a material that forms an alloy or compound with lithium. During discharge, lithium included in the first anode active material layer 922, the second anode active material layer 923, and the third anode active material layer 925, that is, the metal layer, is ionized, and then is transferred toward the cathode layer 910. Accordingly, in the all-solid secondary battery 91, it is possible to use lithium as an anode active material. Further, since the first anode active material layer 922 and/or the second anode active material layer 923 are disposed on and cover the third anode active material layer 925, the first anode active material layer 922 and/or the second anode active material layer 923 serve as a protective layer for the third anode active material layer 925, and serve to suppress the precipitation and growth of lithium dendrite. Accordingly, the short circuit and decrease in capacity of the all-solid secondary battery 1 are suppressed, and as a result, the cycle characteristics of the all-solid secondary battery 91 are improved. Further, when the third anode active material layer 925 is disposed by charging after assembly of the all-solid secondary battery 91, the anode current collector 921, the first anode active material layer 922, the second anode active material layer 923, and an area therebetween are Li-free areas not including lithium (Li) in an initial state or post-discharge state of the all-solid secondary battery.

Solid Electrolyte Layer

Referring to FIGS. 10 to 13, the solid electrolyte layer 930 is disposed between the cathode layer 910 and the anode layer 920, and includes a solid electrolyte.

The solid electrolyte is prepared by a sintering method or the like.

The solid electrolyte is an oxide-based solid electrolyte as described above. Alternatively, or in addition to. the solid electrolyte may be, for example, a sulfide-based solid electrolyte. The sulfide-based solid electrolyte is, for example, $Li_2S—P_2S_5$, $Li_2S—P_2S_5—LiX$ (where X is an halogen), $Li_2S—P_2S_5—Li_2O$, $Li_2S—P_2S_5—Li_2O—LiI$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5—Z_mS_n$ (where m, n are independently a positive number, Z is Ge, Zn, or Ga), $Li_2S—GeS_2$, $Li_2S—SiS_2—Li_3PO_4$, $Li_2S—SiS_2—Li_pMO_q$ (where p, q are independently a positive number, M is P, Si, Ge, B, Al, Ga, or In), $Li_{7-x}PS_{6-x}Cl_x$ (0≤x≤2), $Li_{7-x}PS_{6-x}Br_x$ (0≤x≤2), $Li_{7-x}PS_{6-x}I_x$ (0≤x≤2), or a combination thereof.

The sulfide-based solid electrolyte is prepared by processing starting materials, such as $Li_2S$ and $P_2S_5$, using a melt quenching method or a mechanical milling method. After this treatment, heat treatment may be performed. The sulfide-based solid electrolyte may be amorphous, crystalline, or a combination thereof.

The sulfide-based solid electrolyte may include sulfur (S), phosphorus (P) and lithium (Li) as minimum constituent elements of the above-described sulfide-based solid electrolyte materials. For example, the sulfide-based solid electrolyte may be a material including $Li_2S—P_2S_5$. When the material including $Li_2S—P_2S_5$ is used as the sulfide-based solid electrolyte, the mixing molar ratio of $Li_2S$ to $P_2S_5$ is, for example, in the range of $Li_2S:P_2S_5$ of 50:50 to 90:10.

The sulfide-based solid electrolyte is an argyrodite-type compound including $Li_{7-x}PS_{6-x}Cl_x$ (where 0≤x≤2), $Li_{7-x}PS_{6-x}Br_x$ (where 0≤x≤2), $Li_{7-x}PS_{6-x}I_x$ (where 0≤x≤2), or a combination thereof. In particular, the sulfide-based solid electrolyte is an argyrodite-type compound including $Li_6PS_5Cl$, $Li_6PS_5Br$, $Li_6PS_5I$, or a combination thereof.

The solid electrolyte layer 930 further includes, for example, a binder. Examples of the binder included in the solid electrolyte layer 930 may include, but are not limited to, styrene-butadiene rubber (SBR), polytetrafluoroethylene, polyvinylidene fluoride, polyethylene, or a combination thereof. Any suitable binder may be used. The binder of the solid electrolyte layer 930 may be the same as or different from the binder of the cathode active material layer 912 and the anode active material layer 922.

Cathode Layer

The cathode layer 910 includes a cathode current collector 911 and a cathode active material layer 912.

As the cathode current collector 911, for example, a plate or foil including indium (In), copper (Cu), magnesium (Mg), stainless steel, titanium (Ti), iron (Fe), cobalt (Co), nickel (Ni), zinc (Zn), aluminum (Al) , Germanium (Ge), lithium (Li), or an alloy thereof, or a combination thereof. The cathode current collector 911 may be omitted.

The cathode active material layer 912 includes, for example, a cathode active material. The cathode active material is a material capable of reversibly absorbing and desorbing lithium ions. Examples of the cathode active material may include, but are not limited to, a lithium transition metal oxide such as lithium cobalt oxide (LCO), lithium nickel oxide, lithium nickel cobalt oxide, lithium nickel cobalt aluminum oxide (NCA), lithium nickel cobalt manganese oxide (NCM), lithium manganese oxide manganate), lithium iron phosphate, or a combination thereof, nickel sulfide, copper sulfide, lithium sulfide, iron oxide, and vanadium oxide. Any suitable cathode active material may be used. A combination including at least one of the foregoing cathode active materials may also be used.

The lithium transition metal oxide is, for example, a compound represented by any one of the formulae of $Li_aA_{1-b}B'_bD_2$ (where, 0.90≤a≤1, and 0≤b≤0.5); $Li_aE_{1-b}B'_bO_{2-c}D_c$ (where, 0.90≤a≤1, 0≤b≤0.5, 0≤c≤0.05); $LiE_{2-b}B'_bO_{4-c}D_c$ (where, 0≤b≤0.5, 0≤c≤0.05); $Li_aNi_{1-b-c}Co_bB'_cD_{60}$ (where, 0.90≤a≤1, 0≤b≤0.5, 0≤c≤0.05, $0<\alpha\leq 2$); $Li_aNi_{1-b-c}Co_bB'_cO_{2-\alpha}F'_\alpha$ (where, $0.90\leq a\leq 1$, $0\leq b\leq 0.5$, $0\leq c\leq 0.05$, $0<\alpha<2$); $Li_aNi_{1-b-c}Co_bB'_cO_{2-\alpha}F'_2$ (where, $0.90\leq a\leq 1$, $0\leq b\leq 0.5$, $0\leq c\leq 0.05$, $0<\alpha<2$); $Li_aNi_{1-b-c}Mn_bB'_cD_\alpha$ (where, $0.90\leq a\leq 1$, $0\leq b\leq 0.5$, $0\leq c\leq 0.05$, $0<\alpha\leq 2$); $Li_aNi_{1-b-c}Mn_bB'_cO_{2-\alpha}F'_\alpha$ (where, $0.90\leq a\leq 1$, $0\leq b\leq 0.5$, 023 $c\leq 0.05$, $0<\alpha<2$); $Li_aNi_{1-b-c}Mn_bB'_cO_{2-\alpha}F'_2$ (where, $0.90\leq a\leq 1$, $0\leq b\leq 0.5$, $0\leq c\leq 0.05$, $0<\alpha<2$); $Li_aN_{i_b}E_cG_dO_2$ (where, $0.90\leq a\leq 1$, $0\leq b\leq 0.9$, $0\leq c\leq 0.5$, $0.001\leq d\leq 0.1$); $Li_aNi_bCo_cMn_dGeO_2$ (where, $0.90\leq a\leq 1$, $0\leq b\leq 0.9$, $0\leq c\leq 0.5$, $0\leq d\leq 0.5$, $0.001\leq e\leq 0.1$.); $Li_aNiG_bO_2$ (where, $0.90\leq a\leq 1$, $0.001\leq b\leq 0.1$.); $Li_aCoG_bO_2$ (where, $0.90\leq a\leq 1$, $0.001\leq b\leq 0.1$); $Li_aMnG_bO_2$ (where, $0.90\leq a\leq 1$, $0.001\leq b\leq 0.1$); $Li_aMn_2G_bO_4$ (where, $0.90\leq a\leq 1$, $0.001\leq b\leq 0.01$); $QO_2$; $QS_2$; $LiQS_2$; $LiQS_2$; $V_2O_5$; $LiV_2O_5$; $LiI'O_2$; $LiNiVO_4$; $Li_{(3-f)}J_2(PO_4)_3$ (where $0\leq f\leq 2$); $Li_{(3-f)}Fe_2(PO_4)_3$ (where $0\leq f\leq 2$); $LiFePO_4$, or a combination thereof.

In the above compounds, A is Ni, Co, Mn, or a combination thereof; B' is Al, Ni, Co, Mn, Cr, Fe, Mg, Sr, V, a rare earth element, or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

A compound in which a coating layer is provided on the surface of such a compound may be used, and a combination of the above-described compounds and a compound having a coating layer may also be used. The coating layer provided on the surface of such a compound may include, for example, a coating element compound such as oxide of a coating element, a hydroxide of a coating element, an oxyhydroxide of a coating element, an oxycarbonate of a coating element, or a hydroxycarbonate of a coating element. The compound constituting the coating layer may be amorphous or crystalline or a combination thereof. The coating element included in the coating layer may be Mg, Al, Co, K, Na, Ca, Si, Ti, V, Sn, Ge, Ga, B, As, Zr, or a combination thereof. The method of forming the coating layer is selected may be any suitable method that does not adversely affect the physical properties of the cathode active material. The coating method may be, for example, spray coating or dipping. Since the specific types of coating methods are well understood by those skilled in the art, a detailed description thereof will be omitted.

The cathode active material includes a lithium salt of a transition metal oxide having a layered rock salt type structure among the aforementioned lithium transition metal oxides. The "layered rock salt type structure" refers to a structure in which layers of oxygen atoms and metal atom are alternately and regularly arranged in the <111> direction of a cubic rock salt type structure and thus each of the atomic layers forms a two-dimensional plane. The "cubic rock salt type structure" refers to a sodium chloride (NaCl) type structure, which is a kind of crystal structure, and more specifically, in which face centered cubic lattices (FCCs), which form cations and anions, respectively, are disposed having the number of unit lattice offset by one-half of the ridge of the unit lattice. The lithium transition metal oxide having such layered rock salt structure is a ternary lithium transition metal oxide such as $LiNi_xCo_yAl_zO_2$ (NCA) or $LiNi_xCo_yMn_zO_2$ (NCM) ($0<x<1$, $0<y<1$, $0<z<1$, $x+y+z=1$). When the cathode active material includes a ternary lithium transition metal oxide having the layered rock salt structure, the energy density and thermal stability of the all-solid secondary battery 1 are further improved.

A coating layer may be disposed on the cathode active material as described above. The coating layer may be any coating layer for a cathode active material of an all-solid-state secondary battery. The coating layer may be, for example, $Li_2O$—$ZrO_2$ (LZO).

When the cathode active material contains nickel (Ni) as the ternary lithium transition metal oxide such as NCA or NCM, the capacity density of the all-solid-state secondary battery 1 is increased, thereby reducing the metal dissolution of the cathode active material in the charged state. As a result, the cycle characteristic of the all-solid secondary battery in the charged state is improved.

The shape of the cathode active material is a particle shape such as a true sphere shape or an elliptical shape. The particle diameter of the cathode active material is not particularly limited, and is in a range applicable to the cathode active material of the conventional all-solid secondary battery. The content of the cathode active material of the cathode layer is also not particularly limited, and is in a range applicable to the cathode layer of the conventional all-solid secondary battery.

The cathode layer may further include an additive such as a conductive material, a binder, a filler, a dispersant, an ion conductive assistant, or a combination thereof, in addition to the aforementioned cathode active material and solid electrolyte. Examples of the conductive material include graphite, carbon black, acetylene black, Ketjen black, carbon fiber, and metal powder. Examples of the binder include styrene butadiene rubber (SBR), polytetrafluoroethylene, polyvinylidene fluoride, and polyethylene. The filler, the coating agent, the dispersant, the ion conductive aid, etc., one or more of which may be included in the cathode layer, may be any material used for an electrode of the all-solid secondary battery.

The cathode layer may further include a solid electrolyte. The solid electrolyte included in the cathode layer is to the same as or different from the solid electrolyte included in the solid electrolyte layer. For details of the solid electrolyte, refer to the description of the solid electrolyte layer.

The solid electrolyte included in the anode layer is, for example, an oxide-based solid electrolyte or a sulfide-based solid electrolyte. Alternatively, the cathode layer may be impregnated with a liquid electrolyte. The liquid electrolyte may include a lithium salt and at least one of an ionic liquid and a polymer ionic liquid. The liquid electrolyte may be non-volatile. The ionic liquid has a melting point below room temperature, and refers to a liquid salt or molten salt composed of ions at room temperature. The ionic liquid is a compound including a cation and an anion. The cation may include an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a combination thereof. The anion may include $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $BF_4^-$, $SO_4^-$, $CF_3SO_3^-$, $(FSO_2)_2N^-$, $(C_2F_5SO_2)_2N^-$, $(C_2F_5SO_2)(CF_3SO_2)N^-$, $(CF_3SO_2)_2N^-$, or a combination thereof.

The ionic liquid is, for example, N-methyl-N-propylpyrrolidium bis(trifluoromethanesulfonyl)imide, N-butyl-N-methylpyrrolidium bis(3-trifluoromethylsulfonyl)imide, 1-butyl-3-methylimidazolium bis(trifluoromethylsulfonyl)amide, 1-ethyl-3-methylimidazolium bis(trifluoromethylsulfonyl)amide, or a combination thereof.

The polymer ionic liquid includes a repeat unit including a cation and an anion. The cation of the polymeric ionic liquid includes an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a combination thereof. The anion of the polymeric ionic liquid includes $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $BF_4^-$, $SO_4^-$, $CF_3SO_3^-$, $(FSO_2)_2N^-$, $(C_2F_5SO_2)_2N^-$, $(C_2F_5SO_2)(CF_3SO_2)N^-$, $(CF_3SO_2)_2N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF3)_5PF^-$, $(CF_3)_6P^-$, $SF_5CF_2SO_3^-$, $SF_5CHFCF_2SO_3^-$, $CF_3CF_2(CF_3)_2CO^-$, $CF_3SO_2)_2CH^-$, $(SF_5)_3C^-$, $(O(CF_3)_2C_2(CF_3)_2O)_2PO^-$, or a combination thereof.

Any lithium salt may be used. The lithium salt may be, for example, $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO2)(C_yF_{2y+1}SO_2)$ (x and y are each a natural number), LiCl, LiI, or a combination thereof. The concentration of the lithium salt in the liquid electrolyte may be about 0.1 M to about 5 M. The content of the liquid electrolyte impregnated in the cathode layer 910 is 0 parts by weight to about 100 parts by weight, 0 parts by weight to about 30 parts by weight, 0 parts by weight to about 10 parts by weight, or 0 parts by weight to about 5 parts by weight, with respect to 100 parts by weight of the cathode active material 912 including no liquid electrolyte.

The all-solid secondary battery 91 is manufactured by sequentially preparing the first anode active material layer 922, the second anode active material layer 923, the solid electrolyte 930, and the cathode layer 910, respectively, and laminating these layers.

Preparation of Laminate of Solid Electrolyte Layer/Anode Layer

A composition including a first metal salt, a C1 to C10 aliphatic aldehyde, and sodium hydroxide, which are materials constituting the first anode active material layer 922, is applied onto the solid electrolyte layer 930 to form a first metal layer. The metal layer is heat-treated at about 100° C. to about 600° C., for example, about 100° C. to about 450° C. to form a first anode active material layer, which is a lithium-containing first metal layer including lithium and a first metal, on a surface of the solid electrolyte layer to provide the first anode active material layer 922.

Subsequently, and a binder, a carbon-based anode active material, or a carbon-based anode active material and a second metal salt, which is a material constituting the second anode active material layer 923, are added to a solvent to prepare a second anode active material composition in the form of a slurry. The slurry is applied onto the first anode active material layer 922 and dried to form a second anode active material layer 923 on the surface of the solid electrolyte layer 930.

Subsequently, an anode current collector 921 is disposed on the second anode active material layer 923 and pressed to prepare a laminate of the solid electrolyte layer 930/the anode layer 920. The pressing is, for example, roll pressing, flat pressing, warm isotatic pressing (WIP), cold isotactic pressing (CIP), or the like. The pressure applied during the pressing is, for example, about 50 megapascals (MPa) to about 500 MPa. The time during which the pressure is applied is about 5 milliseconds (ms) to about 10 minutes.

The pressing is performed, for example, at a temperature of about 20° C. to about 90° C. or at a high temperature of 100° C. or greater.

Preparation of Cathode Layer

A cathode active material and a binder, which is a material constituting the cathode active material layer 912, are added to a non-polar solvent to prepare a slurry. The prepared slurry is applied onto the cathode current collector 911 and dried to obtain a laminate. The obtained laminate is pressed to prepare a cathode layer 910. The pressing may be omitted. When the pressing is performed, for example, roll pressing, flat pressing, or pressing using hydrostatic pressure, may be used. The cathode layer 910 is prepared by compressing a mixture of the materials constituting the cathode active material layer 912 into pellets or by stretching (extruding) the mixture into sheets. When the cathode layer 910 is prepared by this method, the cathode current collector 911 may be omitted. Alternatively, the cathode layer 910 may be used after impregnating the cathode layer 910 with the above-described liquid electrolyte.

Preparation of Solid Electrolyte Layer

The solid electrolyte layer 930 including an oxide-based solid electrolyte is prepared by heat-treating a precursor of the oxide-based solid electrolyte.

The oxide-based solid electrolyte may be prepared by contacting the precursor in a stoichiometric amount to form a mixture and heat-treating the mixture. The contacting may include milling, such as ball milling or pulverizing. The mixture of precursors mixed in a stoichiometric composition may be subjected to a primary heat treatment in an oxidizing atmosphere to prepare a primary heat treatment product. The primary heat treatment may be performed at a temperature of less than 1,000° C. for about 1 hour to about 36 hours. The primary heat treatment product may be pulverized. The pulverization of the primary heat treatment product may be performed by dry or wet pulverizing. The wet pulverizing may be performed by mixing a solvent such as methanol and the primary heat treatment product, and then milling the mixture with a ball mill or the like for about 0.5 hours to about 10 hours. The dry pulverizing may be performed by milling with a ball mill without a solvent. The particle diameter of the pulverized resulting product of primary heat treatment may be about 0.1 μm to about 10 μm or about 0.1 μm to about 5 μm. The pulverized primary heat treatment product may be dried. The pulverized primary heat treatment product may be mixed with a binder solution to be formed into pellets, or may be simply roll-pressed by a pressure of about 0.09 to about 1 MPa, or about 0.1 MPa to about 1 MPa to be formed into pellets.

The formed product in pellet form may be subjected to a secondary heat treatment at a temperature of less than 1,000° C. for about 1 hour to about 36 hours. The secondary heat treatment is performed to obtain the solid electrolyte layer 30 as a sintered product. The secondary heat treatment may be performed at about 550° C. to about 1000° C., or about 600° C. to about 900° C., or about 700° C. to about 850° C. The first heat treatment time is about 1 hour to about 36 hours. In order to obtain the sintered product, the secondary heat treatment temperature is greater than the primary heat treatment temperature. For example, the secondary heat treatment temperature may be greater than the primary heat treatment temperature by about 10° C. or greater, about 20° C. or greater, about 30° C. or greater, or about 50° C. or greater. The formed product may be subjected to a secondary heat treatment in at least one of an oxidizing atmosphere or a reducing atmosphere. That is, the second heat treatment may be performed in a) an oxidizing atmosphere, b) a reducing atmosphere, or c) an oxidizing atmosphere and a reducing atmosphere.

The solid electrolyte layer 930 including a sulfide-based solid electrolyte is prepared by, for example, a solid electrolyte formed of a sulfide-based solid electrolyte material.

The sulfide-based solid electrolyte is prepared by processing a precursor materials by a melt quenching method or a mechanical milling method, but the preparation method thereof is not limited thereto, and any method may be used which is suitable to prepare a sulfide-based solid. For example, when the melt quenching method is used, precursor materials such as $Li_2S$ and $P_2S_5$ are mixed in predetermined amounts and formed into pellets, and then the pellets are reacted in vacuum at a predetermined reaction temperature and rapidly cooled to prepare a sulfide-based solid electrolyte material. The reaction temperature of the mixture of $Li_2S$ and $P_2S_5$ is, for example, about 400° C. to about 1,000° C. or about 800° C. to about 900° C. The reaction time is, for example, about 0.1 hours to about 12 hours, or about 1 hour to about 12 hours. The quenching temperature of the reactants is 10° C. or less, or 0° C. or less, and the quenching rate of the reactants is about 1° C. per second (/sec) to about 10,000° C./sec or about 1° C./sec to about 1,000° C./sec. For example, when using the mechanical milling method, a sulfide-based solid electrolyte material is prepared by stirring and reacting starting materials such as $Li_2S$ and $P_2S_5$ using a ball mill. Although the stirring speed and stirring time of the mechanical milling method are not particularly limited, the faster the stirring speed, the faster the production speed of the sulfide-based solid electrolyte material. The longer the stirring time, the higher the conversion rate of the raw material to the sulfide-based solid electrolyte material. Subsequently, the mixed raw material obtained by a melt quenching method, or the mechanical milling method, is heat-treated at a predetermined temperature and then pulverized to prepare a solid electrolyte having a particle shape. When the solid electrolyte has glass transition characteristics, it is possible to convert the material from an amorphous form to a crystalline form by heat treatment.

The solid electrolyte layer 30 is prepared by depositing the solid electrolyte using a film forming method such as an aerosol deposition method, a cold spray method, or a sputtering method. Alternatively, the solid electrolyte layer 930 may be prepared by pressing the solid electrolyte particles. Alternatively, the solid electrolyte layer 930 may be prepared by mixing a solid electrolyte, a solvent, and a binder, and drying and pressing the mixture.

Manufacture of All-Solid-State Secondary Battery

The cathode layer 910, the anode layer 920, and the solid electrolyte layer 930, which are prepared by the aforementioned methods, are laminated such that the solid electrolyte layer 930 is provided between the cathode layer 910 and the anode layer 920, and are pressed to manufacture an all-solid-state secondary battery 91.

For example, the laminate of the anode layer 920/the solid electrolyte layer 930 is disposed on the cathode layer 910 such that the cathode layer 910 and the solid electrolyte layer 930 are in contact with each other to prepare a second laminate, and the second laminate is pressed to manufacture the all-solid secondary battery 910. The pressing may be omitted. is the pressing may be, for example, roll pressing, flat pressing, or pressurization using hydrostatic pressure. The pressure applied during the pressing is, for example, about 50 MPa to about 750 MPa, or about 100 MPa to about 700 MPa, or about 100 MPa to about 500 MPa. The time during which the pressure is applied is about 5 ms to about 5 min. The pressing is performed at a temperature of about room temperature (about 20° C.) to about 90° C. or a temperature of about 25° C. to about 90° C. Alternatively, the pressing is performed at a high temperature of 100° C. or greater, for example about 100° C. to about 900° C., or about 100° C. to about 500° C. The configuration and manufacturing method of the aforementioned all-solid-state secondary battery are examples of embodiments, and the structural members, manufacturing processes, and the like thereof may be changed as appropriate. The pressing may be omitted.

This embodiments of the present disclosure will be described in more detail through the following Examples and Comparative Examples. However, these Examples are only for illustrative purposes and are not intended to limit the scope of the present disclosure.

EXAMPLES

Preparation Example 1: Preparation of LLZO Film $Li_7La_3Zr_2O_{12}$ (LLZO) powder was obtained by a solid phase method. The $Li_7La_3Zr_2O_{12}$ (LLZO) powder was prepared in the same manner as in Example 1 of U.S. Patent Publication 2016/0149260, which is incorporated herein by reference, except that $Li_2CO_3$, LiOH, $La_2O_3$, $ZrO_2$ were used as oxide precursors.

The $Li_7La_3Zr_2O_{12}$ (LLZO) powder and lithium carbonate ($Li_2CO_3$) were uniaxially pressed by a pressure of about 10 MPa to form a film. The content of lithium carbonate ($Li_2CO_3$) is 5.5 parts by weight based on 100 parts by weight of the total weight of $Li_7La_3Zr_2O_{12}$ (LLZO) powder and lithium carbonate ($Li_2CO_3$).

Subsequently, the film was covered with mother powder ($Li_7La_3Zr_2O_{12}$) and then heat-treated at 1,300° C. for 4 hours. The surface of the heat-treated film was polished using an autopolisher to prepare an LLZO film (thickness: about 495 μm).

Example 1

Preparation of Laminate of Solid Electrolyte Layer/Anode Layer 1.02 g of silver nitrate was dissolved in a mixed solvent of water and ethanol to obtain a silver nitrate solution. The volume ratio of water and ethanol in the mixed solvent is 1:1. Saturated ammonia water was added dropwise to the silver nitrate solution until the black precipitate disappeared. Black precipitate was then formed by adding 20 milliliters (ml) of a 0.2 M aqueous potassium hydroxide solution to this solution. Ammonia water was added to the resultant to dissolve all the black precipitates to make a transparent, silver nitrate solution.

0.26 grams (g) of glucose was dissolved in 3 ml of the mixed solvent of water and ethanol to obtain a glucose solution.

The silver nitrate solution and the glucose solution were mixed and stirred, subjected to a solution infiltration process, cleaned using the mixed solvent of water and ethanol, and then dried at about 60° C. to provide a silver (Ag) layer having a thickness of about 0.8 μm on the solid electrolyte layer. The LLZO ($Li_7La_3Zr_2O_{12}$) pellet having a thickness of 495 μm, obtained according to Preparation Example 1, was prepared as the solid electrolyte layer.

The resulting product was heat-treated at about 300° C. to form a solid electrolyte/Li-containing silver (Ag) layer structure, in which solid electrolyte layer (LLZO) and Li-containing silver (Ag) layer are laminated. In the Li-containing silver (Ag) layer of the solid electrolyte/Li-containing silver (Ag) layer structure (thickness: 800 nm), a thermally bonded Li—Ag interlayer was formed in an area directly adjacent to the solid electrolyte layer. Here, the Li—Ag interlayer is a Li—Ag alloy layer, and the Li-containing Ag layer includes a Li—Ag alloy layer and a silver (Ag) layer as the first anode active material layer, and the Li—Ag alloy layer and a silver (Ag) layer are difficult to distinguish from each other.

Separately, a slurry for forming a nano(size) Ag—C coating layer, which is a composition for forming the second anode active material layer, was prepared according to the following procedure.

As the anode active material, carbon black (CB) having a primary diameter of 38 nm and silver (Ag) particles having an average particle diameter of about 100 nm were prepared.

3 g of carbon black (CB) and 1 g of silver (Ag) particles were put into a container, 2.692 g of a binder composed of poly(vinyl alcohol) (PVA) and poly(acrylic acid) (PAA) (PVA-PAA binder; Product name: AG binder, manufactured by SUMITOMO SEIKA CHEMICALS CO., LTD.) and 7 g of distilled water were added thereto, and a first stirring was performed at 1,000 rotations per minute (rpm) for 30 minutes to prepare a slurry.

The slurry was applied onto the solid electrolyte layer/Li-containing silver (Ag) layer structure by spin coating, dried at room temperature (25° C.) for 1 hour, and then dried in a vacuum for 12 hours to laminate a nano Ag—C coating layer having a thickness of about 12 µm. As a result, a solid electrolyte layer/ Li-containing silver (Ag) layer/ nano Ag—C coating layer structure was prepared.

An anode current collector made of a copper (Cu) foil and having a thickness of 10 µm was disposed on the solid electrolyte layer/ Li-containing silver (Ag) layer/nano Ag—C coating layer structure, and was attached thereto by applying a pressure of 250 MPa at 25° C. through cold isotactic pressing (CIP), to prepare a solid electrolyte/ anode layer laminate.

(Preparation of Cathode Layer)

$LiNi_{0.8}Co_{0.15}Mn_{0.05}O_2$ (NCM) as a cathode active material, polytetrafluoroethylene (Teflon (registered trademark) manufactured by DuPont Corporation) as a binder, and carbon nanofibers (CNF) as a conductive agent were prepared. Then, these materials were mixed at a weight ratio of cathode active material: conductive agent: binder of 100:2:1 to obtain a mixture. The mixture was stretched into a sheet form to prepare a cathode active material sheet.

The cathode active material sheet was pressed onto a cathode current collector made of aluminum foil having a thickness of 18 µm to prepare a cathode layer. The cathode active material layer of the prepare cathode layer was immersed into an electrolyte solution in which 2.0M LiFSI is dissolved in the ionic liquid N-propyl-N-methyl-pyrrolidinium bis(fluorosulfonyl)imide (Pyr13FSI).

(Manufacture of All-Solid Secondary Battery)

The cathode layer was disposed in a stainless steel (SUS) cap such that the cathode active material layer impregnated with the ionic liquid electrolyte faces upward. The solid electrolyte layer/anode layer laminate with the anode layer attached thereto is disposed such that the solid electrolyte layer is disposed on the cathode active material layer, and was sealed to manufacture an all-solid secondary battery. The cathode layer and the anode layer were insulated from each other by an insulator. A part of the cathode current collector and a part of the anode current collector protruded out of the sealed battery, and were used as a cathode layer terminal and an anode layer terminal.

Example 2

A solid electrolyte layer/silver layer structure and an all-solid secondary battery were manufactured in the same manner as in Example 1, except that when preparing the solid electrolyte layer/Li-containing Ag layer structure, the heat treatment temperature was changed to 400° C. instead of 300° C.

Example 3

A solid electrolyte layer/silver layer structure and an all-solid secondary battery were manufactured in the same manner as in Example 1, except that when preparing the solid electrolyte layer/Li-containing Ag layer structure, the heat treatment temperature was changed to 450° C. instead of 300° C.

Comparative Example 1

A silver (Ag) sheet having a thickness of 2 µm was prepared.

2 g of silver particles were put into a container, and 1.34 g of a polyvinylidene fluoride binder (PVDF; product name: SOLEF 75130, manufactured by Solvay Corporation) was dissolved in 3 g of N-methyl-2-pyrrolidone (NMP) and stirred at 1,200 rpm for 2 hours to prepare a slurry. A SUS foil (10 µm) was coated with the slurry using a bar coater to prepare an Ag sheet having a thickness of 2 µm.

The Ag sheet was disposed on the solid electrolyte, and a pressure of 250 MPa was applied at 25° C. by a cold isotactic pressing (CIP) to form an Ag layer on the solid electrolyte layer. An LLZO ($Li_7La_3Zr_2O_{12}$) film having a thickness of 495 µm was prepared as the solid electrolyte layer to form a solid electrolyte layer/Ag layer structure.

The slurry for forming a nano Ag—C coating layer, prepared in Example 1, was applied onto the solid electrolyte layer/Ag layer structure and dried to form a Ag—C coating layer, thereby preparing a solid electrolyte layer/Ag layer/Ag—C coating layer structure and an all-solid secondary battery.

Comparative Example 2

A solid electrolyte layer/Ag layer/Ag—C coating layer structure and an all-solid secondary battery were manufactured in the same manner as in Example 1, except that heat treatment was not performed when preparing a solid electrolyte (LLZO) layer and Li-containing Ag layer structure.

Comparative Example 3

A solid electrolyte layer/Li-containing Ag layer/Ag—C coating layer structure and an all-solid secondary battery were manufactured in the same manner as in Example 1, except that heat treatment temperature was changed from 300° C. to 600° C. when preparing a solid electrolyte (LLZO) layer and Li-containing Ag layer structure.

Comparative Example 4

The slurry for forming a nano Ag—C coating layer, prepared in Example 1, was applied onto the solid electrolyte layer by spin coating, dried at room temperature (25°

C.), and then dried in vacuum for 12 hours to form a nano Ag—C coating layer having a thickness of about 12 μm. As a result, a solid electrolyte layer/nano Ag—C coating layer structure having the following laminate structure was prepared.

An anode current collector made of a copper (Cu) foil having a thickness of 10 μm was disposed on the solid electrolyte layer/ nano Ag—C coating layer structure, and was attached thereto by applying a pressure of 250 MPa at 25° C. through cold isotactic pressing (CIP) to prepare a solid electrolyte layer/anode layer laminate.

A solid electrolyte layer/Li-containing Ag layer/Ag—C coating layer structure and an all-solid secondary battery were manufactured in the same manner as in Example 1, except that the solid electrolyte layer/anode layer laminate of Comparative Example 4 was used instead of the solid electrolyte layer/anode layer laminate of Example 1.

Figure 2A:
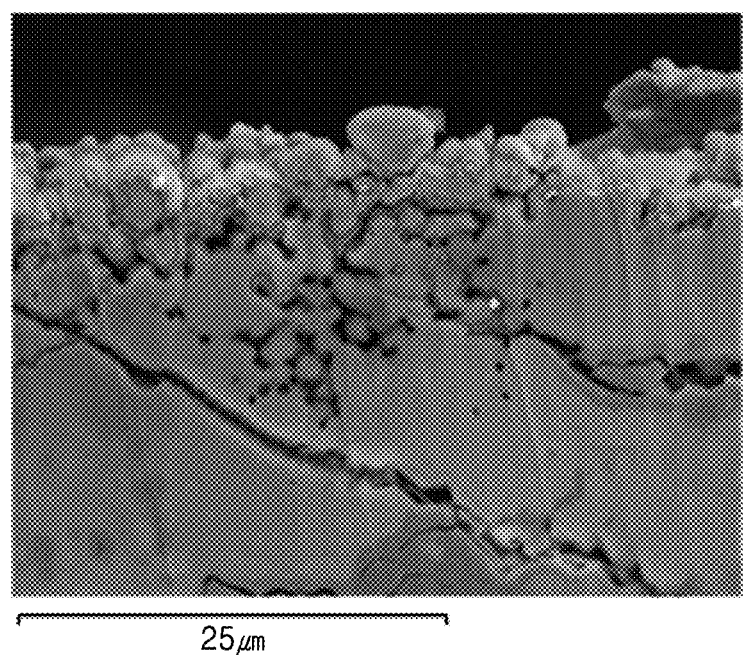
FIGS. 2A to 2C are scanning electron microscopy (SEM)/energy dispersive X-ray (EDX) analysis images of a cross-section of the solid electrolyte layer/first anode active material layer/second anode active material layer laminate of Example 1.
Figure 2B:
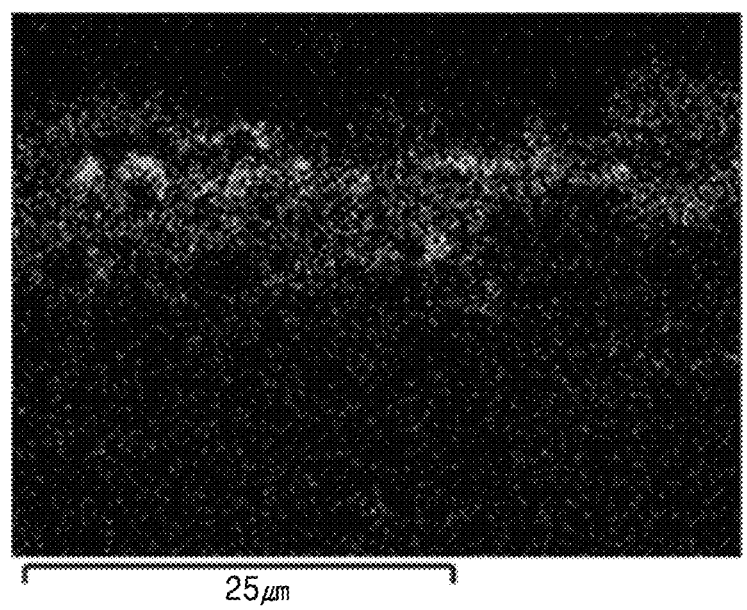
Figure 2C:
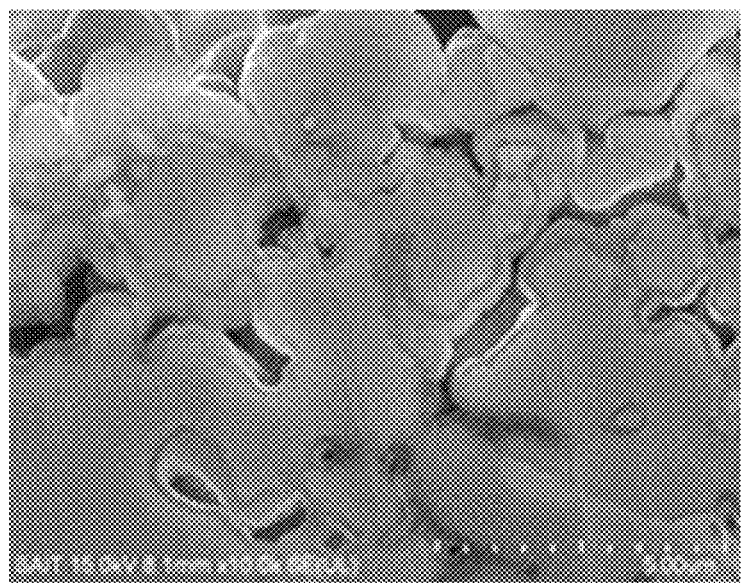
Figure 3A:
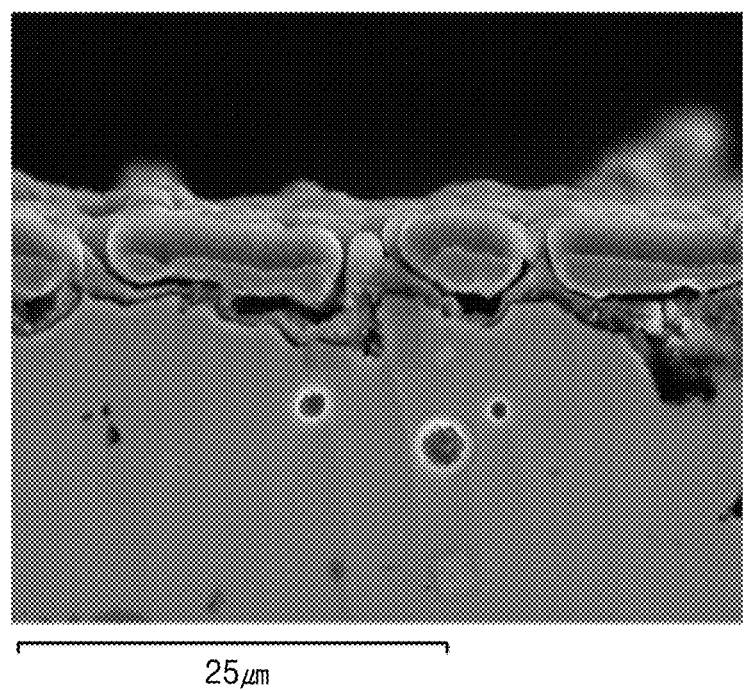
FIGS. 3A to 3C are SEM/EDX analysis images of a cross-section of the solid electrolyte layer/first anode active material layer/second anode active material layer laminate of Comparative Example 1.
Figure 3B:
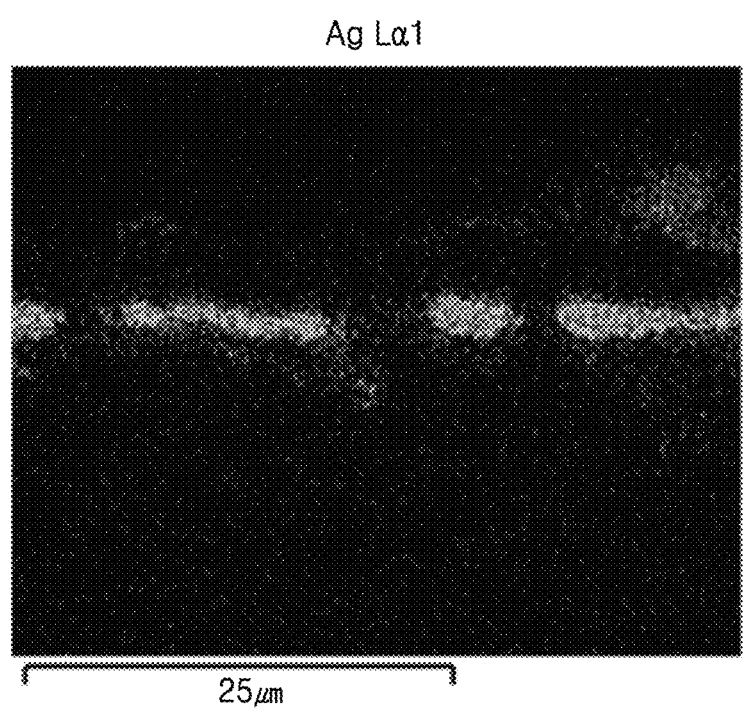
Figure 3C:
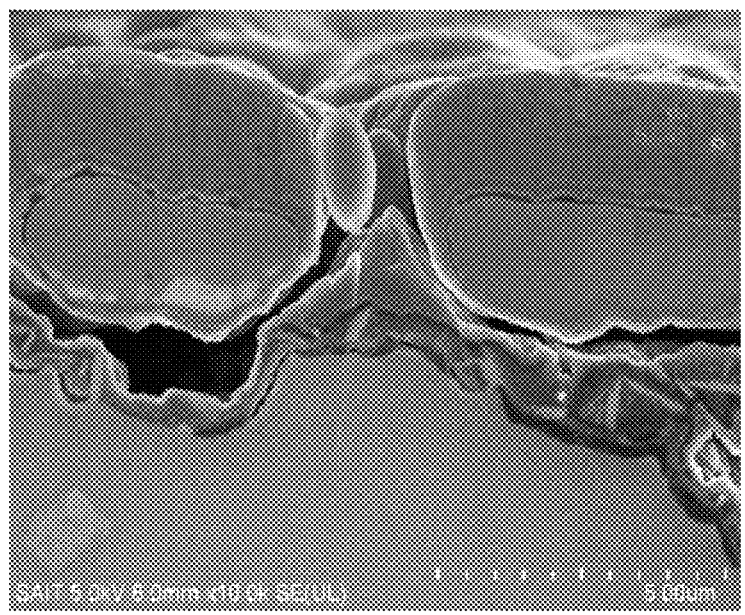
Figure 4A:
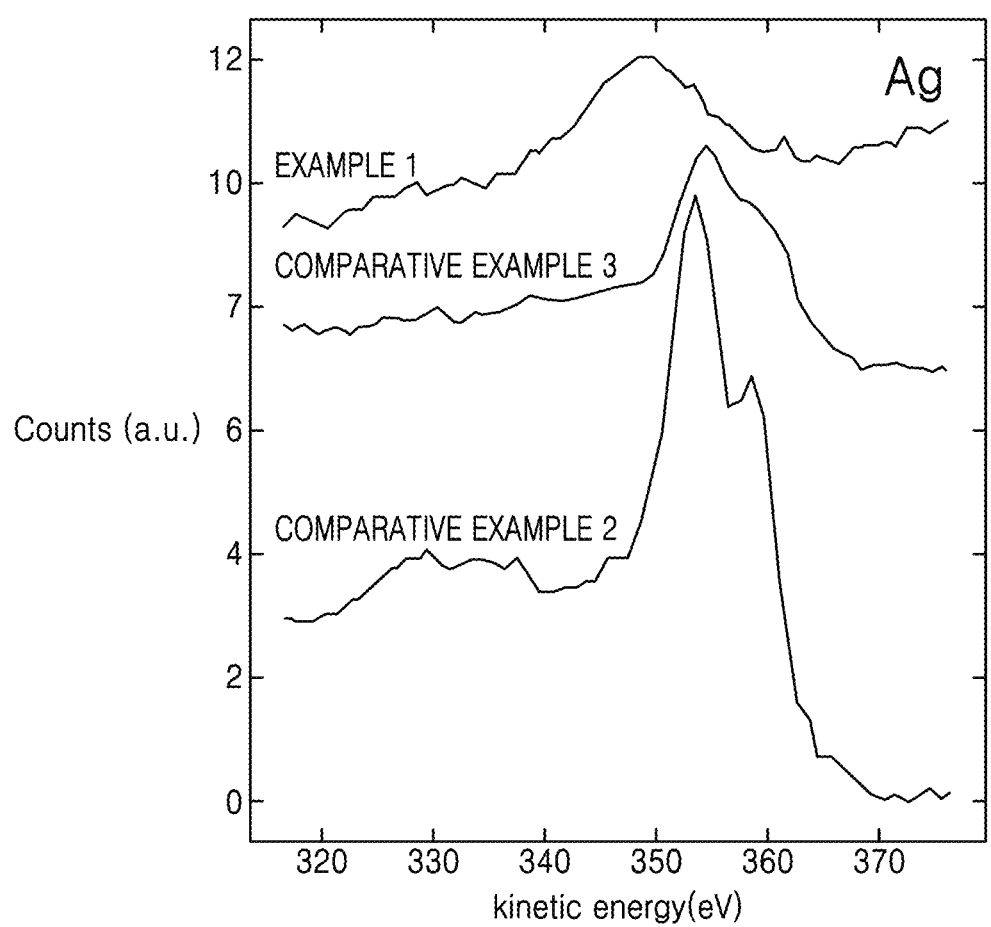
FIGS. 4A to 4D are graphs of counts (arbitrary units) versus kinetic energy (electron volts, eV), illustrating the results of auger electron spectroscopy (AES) analysis of the structure of Example 1 and the structures of Comparative Examples 2 and 3.
Figure 4B:
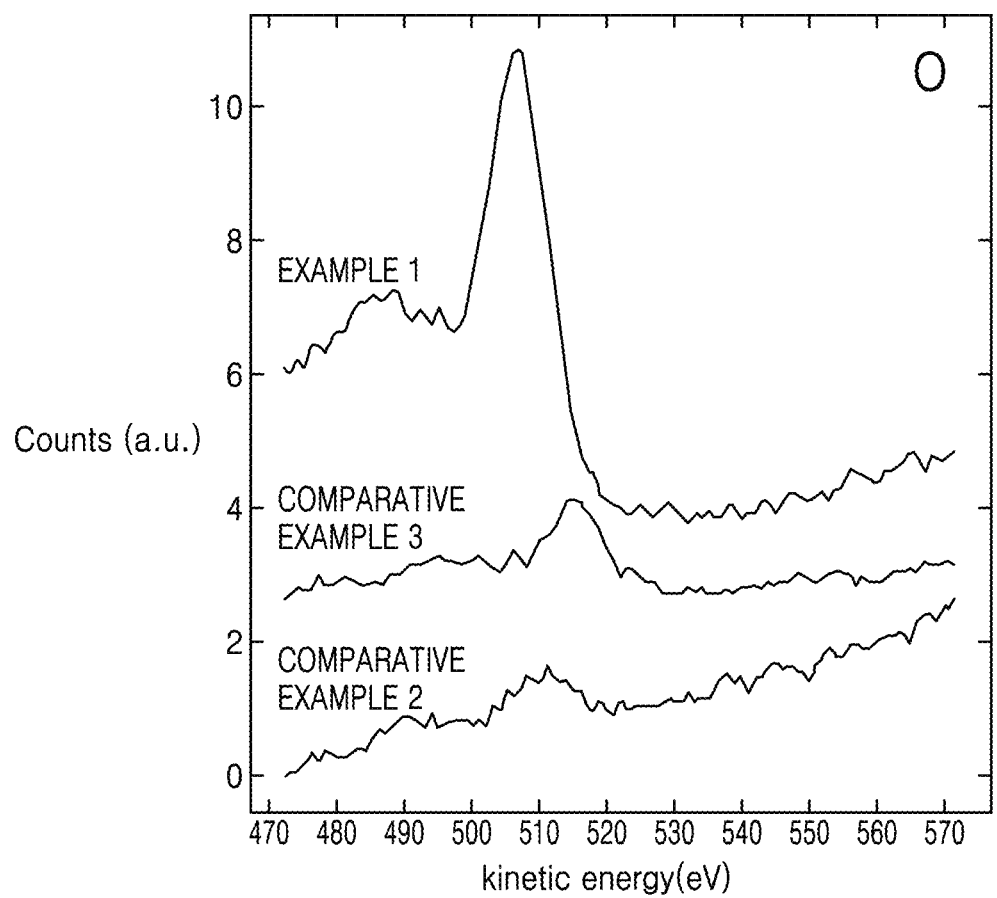
Figure 4C:
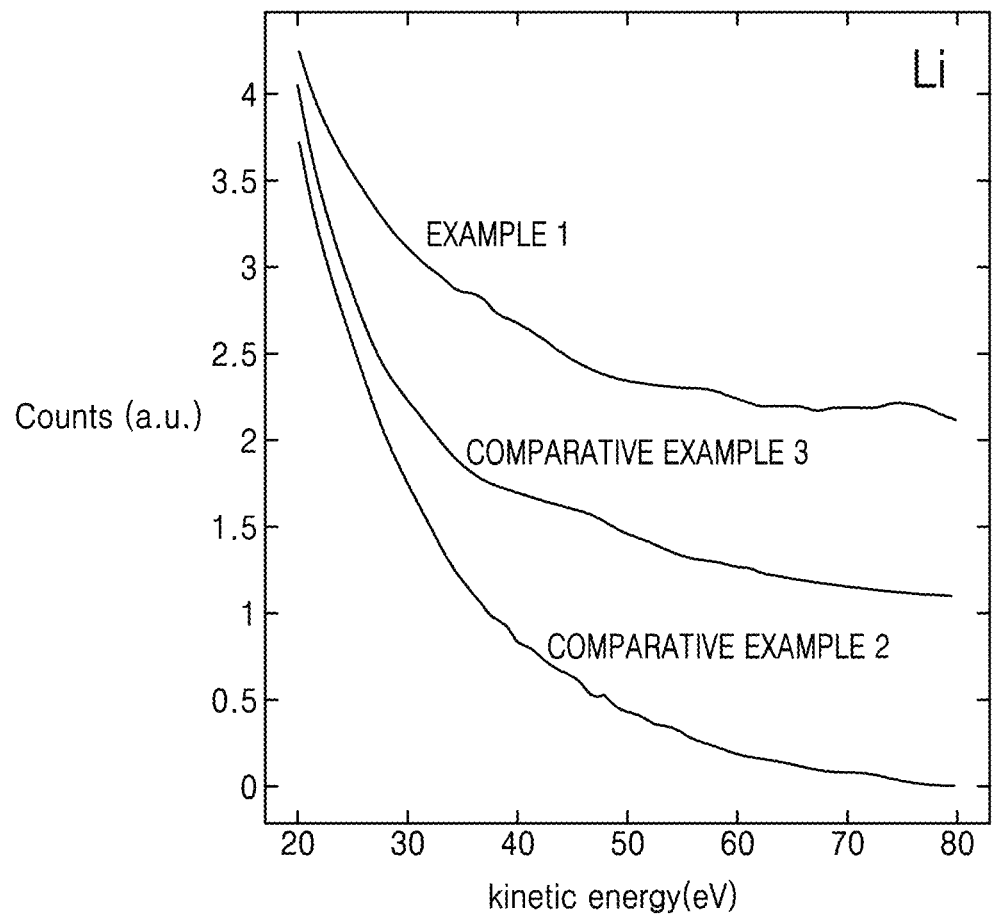
Figure 4D:
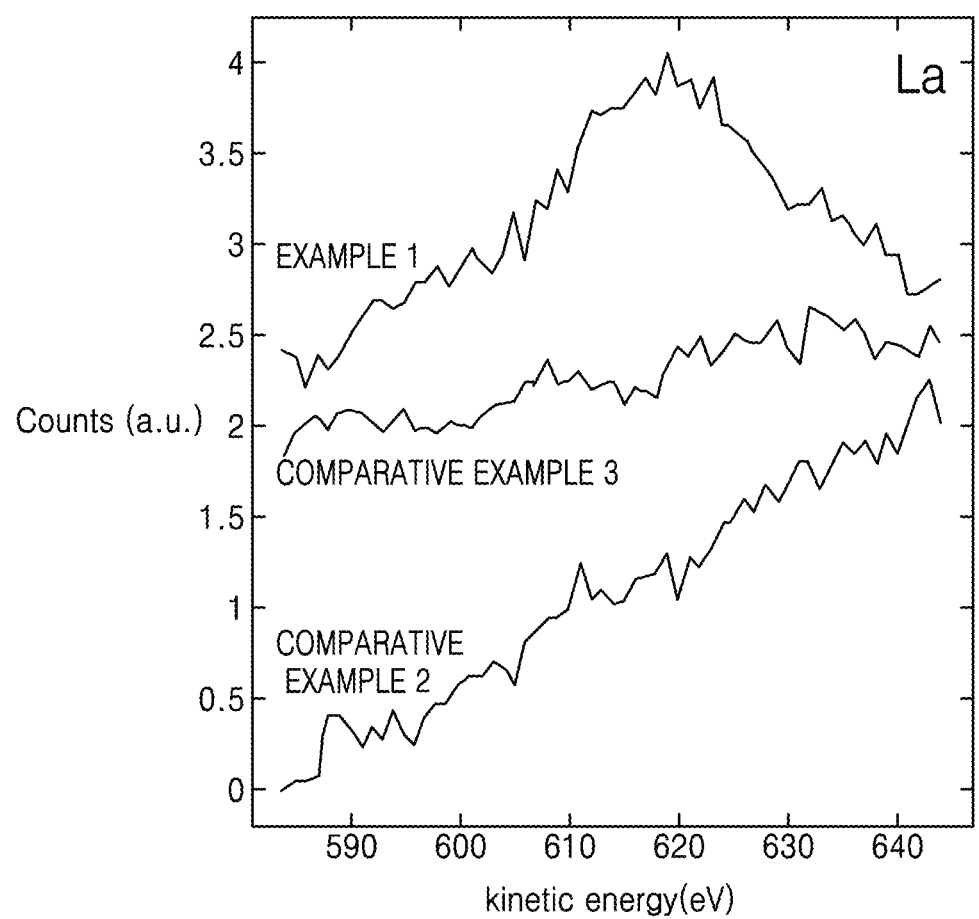

Evaluation Example 1: Electron Scanning Microscope (SEM) and energy-dispersive X-ray (EXD) spectroscopy Cross-sections of the solid electrolyte layer/Li-containing Ag layer/nano Ag—C coating layer structure of Example 1 and the solid electrolyte layer/Ag layer/Ag—C coating layer structure of Comparative Example 1 were analyzed by SEM/EDX. FIGS. 2A to 2C are SEM/EDX images of the cross-section of the solid electrolyte layer/first anode active material layer laminate of Example 1, and FIGS. 3A to 3C are SEM/EDX images of the cross-section of the solid electrolyte layer/first anode active material layer laminate of Comparative Example 1. FIGS. 2B and 3B are Ag mapping images obtained by energy-dispersive X-ray spectroscopy (EDX), and FIGS. 2A, 2C, 3A, and 3C are carbon mapping images.

For reference, in the structure of Example 1, as shown in FIG. 2B, silver is uniformly disposed on the upper surface of the solid electrolyte layer. Further, as shown in FIG. 2B, silver is also partially present in the solid electrolyte layer.

In contrast, in the structure of Comparative Example 1, as shown in FIG. 3B, silver is discontinuously disposed on the surface of the solid electrolyte layer. Further, in the structure of Comparative Example 1, unlike the structure of Example 1, silver is not present in the solid electrolyte layer.

From the above results, it may be found that, in the structure of Example 1, silver is in pores present at the surface of the solid electrolyte layer, and thus a uniform interface may be formed even inside the surface of the solid electrolyte layer.

Evaluation Example 2: Auger Electron Spectroscopy (AES)

AES analysis was carried out on the structures of Example 1, Comparative Example 2, and Comparative Example 3, and the analysis results thereof are shown in FIGS. 4A to 4D and Table 1 below. The AES analysis was carried out using a PHI 710 AES (ULVAC Corporation).

From the AES analysis results, it may be found that a Li—Ag alloy layer is formed by diffusion of Li from the solid electrolyte layer during heat treatment after the metal (Ag) coating. Further, it may be found that in the case of heat treatment at 600° C. (Comparative Example 2), Li—O or Li—C—O was formed into a relatively thick layer, whereby a Li-depletion layer increases at the interface of the solid electrolyte layer.

TABLE 1

| Class. | Li(at %) | Ag(at %) | La(at %) | Zr(at %) | O(at %) |
|---|---|---|---|---|---|
| Example 1 | 16.2 | 25.4 | 4.46 | 0 | 30.5 |
| Comparative Example 1 | 0.20 | 33.9 | 2.88 | 0 | 5.93 |
| Comparative Example 3 | 3.54 | 5.03 | 23.2 | 0 | 57.3 |

Evaluation Example 3: Evaluation of Interfacial Resistance and Limiting Current Density For the all-solid secondary batteries manufactured according to Examples 1 to 3 and Comparative Example 3, overall resistance was measured, respectively. Here, the overall resistance is a sum of interfacial resistance and ohmic resistance.

For the all-solid secondary battery prepared in Examples 1-3 and Comparative Example 3, the impedances of pellets were measured by a 2-probe method using an impedance analyzer (Solartron 1400A/1455A), respectively. The frequency range was 0.1 hertz (Hz) to 1 megahertz (MHz), and the amplitude voltage was 10 millivolts (mV). The measurements were performed at 25° C. in an air atmosphere.

Figure 5A:
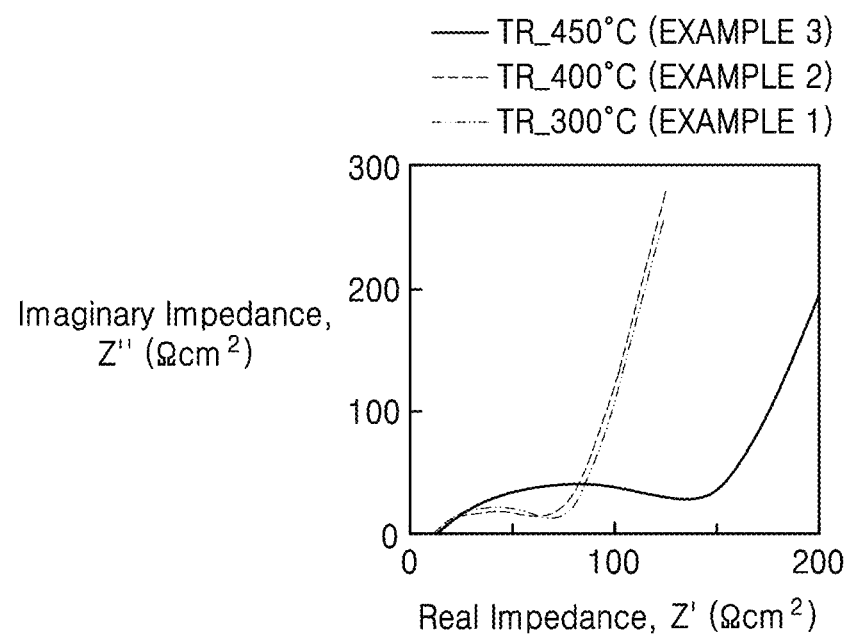
FIG. 5A is a Nyquist plot of the imaginary portion of the impedance ($-Z''$, ohm square centimeter, $\Omega \cdot cm^2$) versus the real portion of the impedance ($Z'$, $\Omega \cdot cm^2$), showing the results of impedance analysis of the all-solid secondary batteries of Examples 1 to 3.
Figure 5B:
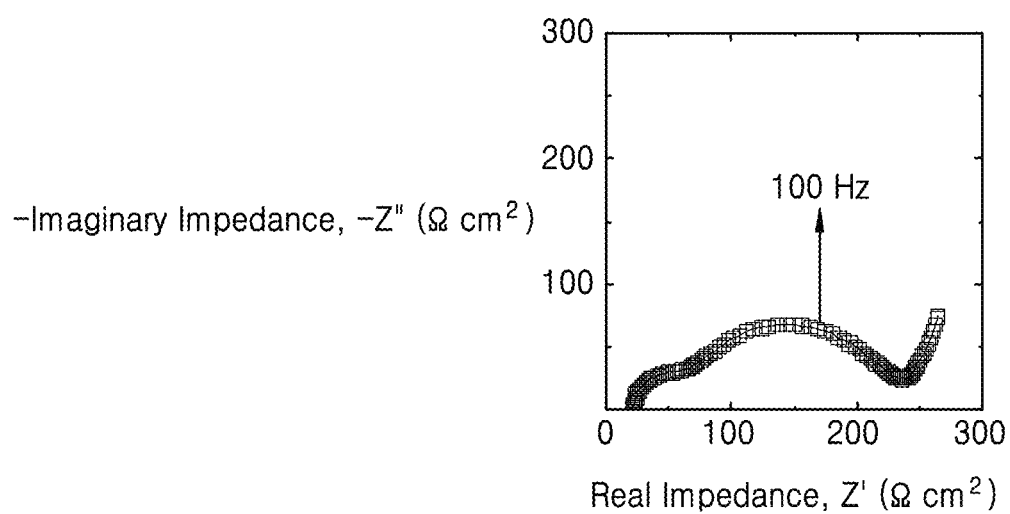
FIG. 5B is a Nyquist plot of the imaginary portion of the impedance ($-Z''$, $\Omega \cdot cm^2$) versus the real portion of the impedance ($Z'$, $\Omega \cdot cm^2$), showing the results of impedance analysis of the all-solid secondary battery of Comparative Example 3.

Nyquist plots for the impedance measurement results of the all-solid secondary batteries manufactured in Examples 1-3 and Comparative Example 3 are shown in FIGS. 5A and 5B. Further, as a result of fitting the Nyquist plot to an equivalent circuit, the interfacial resistance and limiting current density of the all-solid secondary battery of Comparative Example 1 are shown in Table 2 below.

TABLE 2

| Class. | Interfacial resistance ($\Omega$ cm$^2$) @25° C. | Limiting current density (mA/cm$^2$) @25° C. |
|---|---|---|
| Example 1 | 53 | 2.0 |
| Example 2 | 51 | 2.0 |
| Example 3 | 95 | 1.6 |
| Comparative Example 1 | 200 | 1.6 |
| Comparative Example 3 | 107 | 1.0 |

As shown in Table 2, it may found that the interfacial resistance of each of the all-solid secondary batteries of Examples 1 to 3 was reduced as compared with Comparative Examples 1 and 3. Since the active areas of the solid electrolyte layer and the metal anode layer are relatively small when the formation of a silver layer is carried out according to a transfer method using mechanical pressure, the all-solid secondary battery of Comparative Example 1 exhibited a large interfacial resistance as compared with the all-solid secondary batteries of Examples 1 to 3.

As shown in FIGS. 5A and 5B, the ohmic resistance of the all-solid secondary batteries of Examples 1 to 3 was also reduced as compared with those of the all-solid secondary batteries of Comparative Example 3.

Accordingly, as a result of fitting the Nyquist plot of FIG. 10 to an equivalent circuit, the overall resistance of the all-solid secondary battery of Comparative Example 3 was about 250 ohm square centimeters ($\Omega$cm$^2$), and the overall resistance of the all-solid secondary battery of Example 1 was about 150 $\Omega$cm$^2$. As described above, it was confirmed that the overall resistance of the all-solid-state battery of Example 1 was reduced as compared with that of the all-solid-state battery of Comparative Example 3.

Without being limited by theory, the reason why there is a reduction in the overall resistance of the all-solid secondary batteries of Examples 1 to 3 is because during the heat treatment of a precursor layer (the Ag metal layer), the precursor layer is sintered with the solid electrolyte layer to form a covalent bond between the solid electrolyte layer and the first anode active material layer, so that the active interfacial area increases, thereby increasing the diffusion rate of lithium ions.

Evaluation Example 4: Mixing Ratio of Lithium and Silver in Li-Containing Metal Layer Mixing ratios of lithium and silver in the Li-containing silver layers of Examples 1 to 3 and the silver layer of Comparative Example 1 were evaluated using Auger Electron Spectroscopy. The evaluation results thereof are given in Table 3 below. The mixing ratio of lithium and silver was evaluated based on an atomic percent ratio of lithium and silver. Atomic percent is a percentage of the number of atoms, and the atomic percent ratio is a ratio of the number of atoms.

TABLE 3

| Class. | Atomic percent (at %) ratio of lithium to silver |
|---|---|
| Example 1 | 0.65:1 |
| Example 2 | 0.65:1 |
| Example 3 | 0.65:1 |
| Comparative Example1 | 0.0087:1 |

From Table 3, it may be found that the atomic percent ratio of lithium to silver in each of the Li-containing Ag layers of Examples 1 to 3 is 0.65:1. However, the atomic percent ratio of lithium to silver in the Li-containing Ag layer of Comparative Example 1 is 0.0087:1, so the reactive content of lithium is greatly reduced.

Evaluation Example 5: Charge-Discharge Cycle Test

In order to check the short-circuit prevention characteristics of a solid electrolyte, a charge-discharge cycle test was performed using a galvanostatic method.

The charge-discharge characteristics of the all-solid secondary batteries manufactured in Examples 1 to 3 and Comparative Examples 2 and 3 were evaluated by the following charge-discharge tests. The charge-discharge test was performed by placing an all-solid secondary battery in a thermostat at 60° C.

In the first cycle, the all-solid secondary battery was charged with a constant current of 0.3 milliamperes per square centimeter (mA/cm$^2$) until the battery voltage reached 4.3 volts (V). Subsequently, the all-solid secondary battery was discharged with a constant current of 0.3 mA/cm$^2$ until the battery voltage reached 2.8 V.

In the second cycle, the all-solid secondary battery was charged with a constant current of 1 mA/cm$^2$ until the battery voltage reached 4.3 V. Subsequently, the all-solid secondary battery was discharged with a constant current of 1 mA/cm$^2$ until the battery voltage reached 2.8 V.

In the third cycle, the all-solid secondary battery was charged with a constant current of 1.6 mA/cm$^2$ until the battery voltage reached 4.3 V. Subsequently, the all-solid secondary battery was discharged with a constant current of 1.6 mA/cm$^2$ until the battery voltage reached 2.8 V.

A total of 30 cycles of charge and discharge were performed by repeatedly performing the third cycle.

Figure 6A:
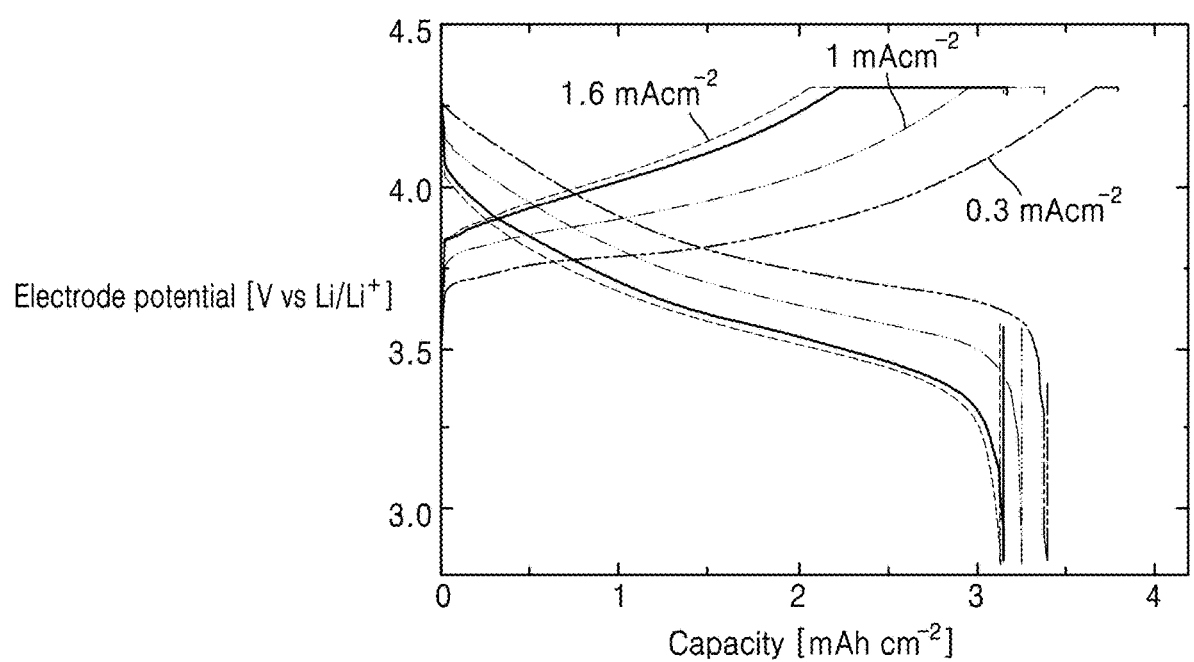
FIG. 6A is a graph of electrode potential (volts (V) versus Li/Li$^+$) versus capacity (milliampere hours per square centimeter, mAh/cm$^2$), illustrating the charge-discharge test results of the all-solid secondary battery of Example 1.
Figure 6B:
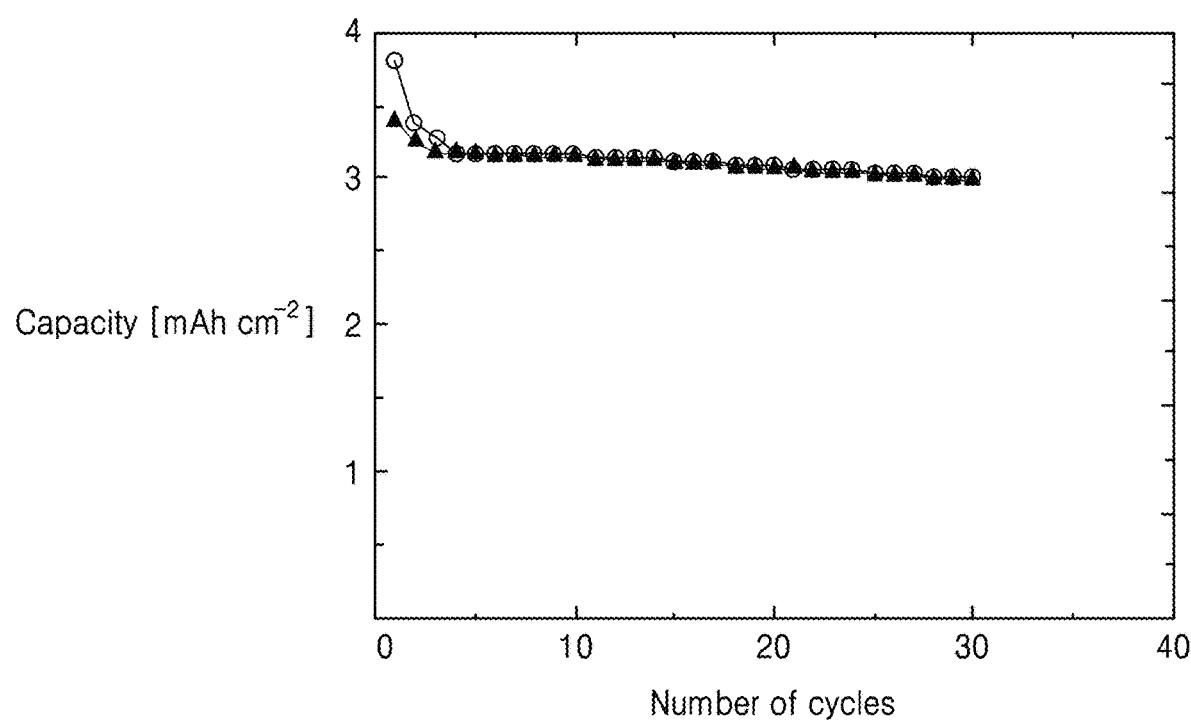
FIG. 6B is a graph of capacity (mAh/cm$^2$) versus cycle number, illustrating the charge-discharge test results of the all-solid secondary battery of Example 1.
Figure 7A:
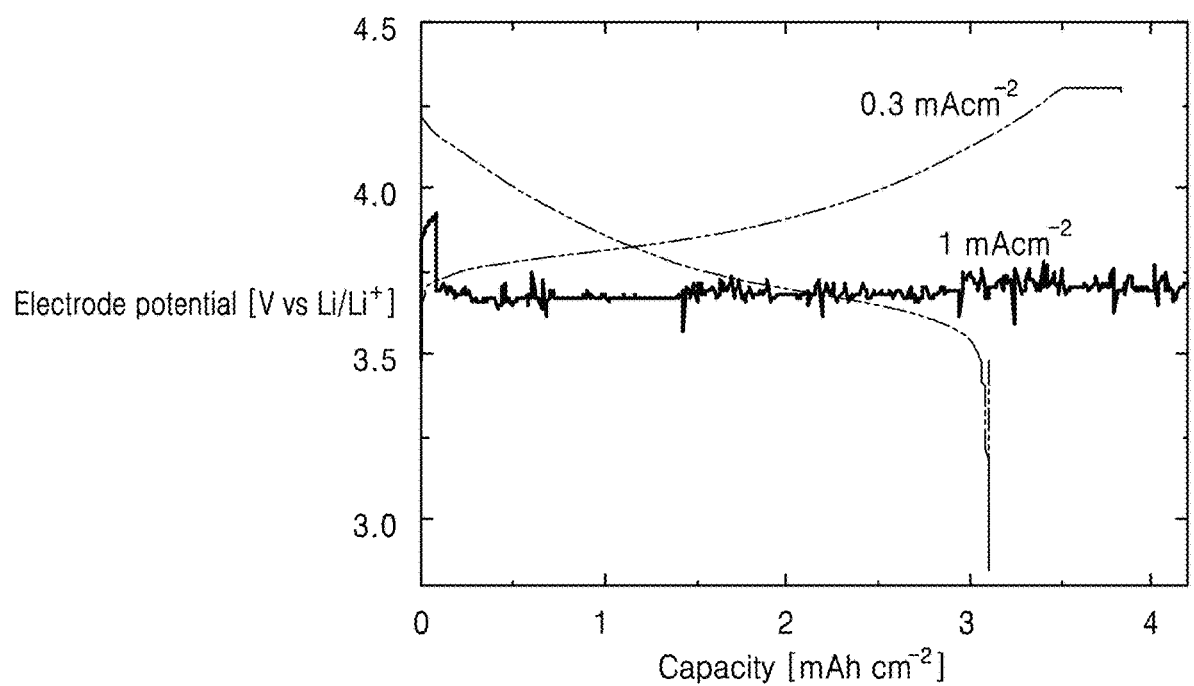
FIGS. 7A and 7B are graphs of electrode potential (V versus Li/Li$^+$) versus capacity (mAh/cm$^2$), illustrating the charge-discharge test results of the all-solid secondary batteries of Comparative Examples 2 and 3, respectively.
Figure 7B:
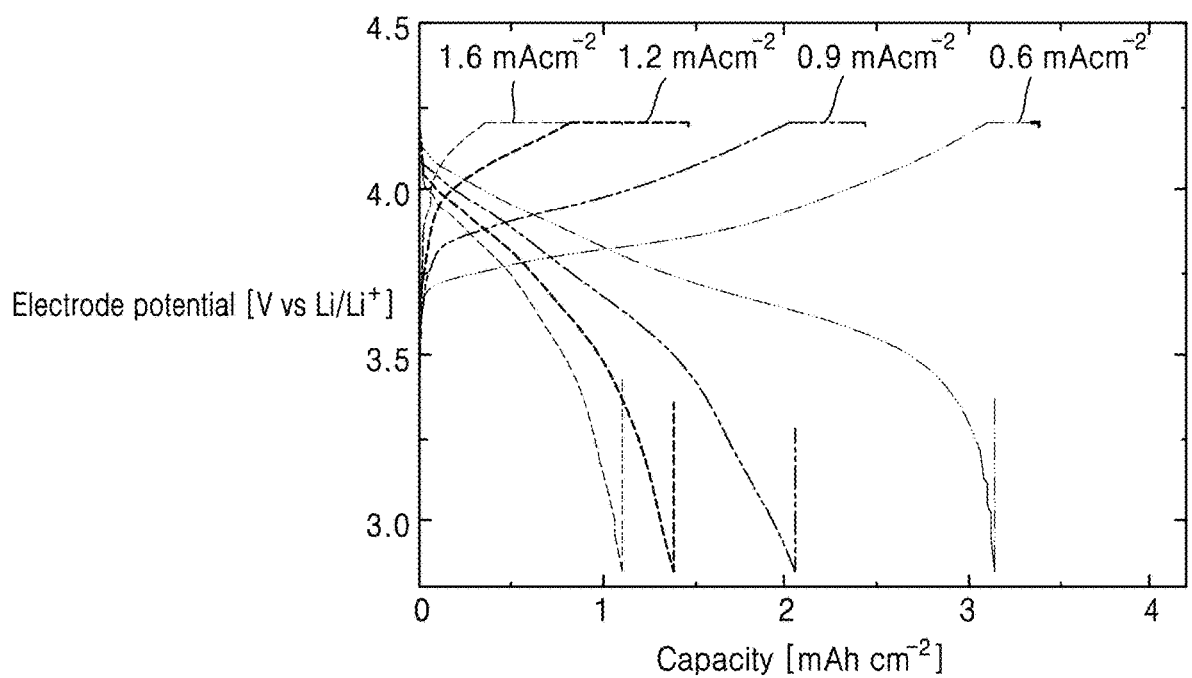

The results of the charge-discharge test of the all-solid secondary battery of Example 1 are shown in FIGS. 6A and 6B. In the charge-discharge test, the all-solid secondary battery is driven at 0.3 mA/cm$^2$ and 1 mA/cm$^2$ for 1 cycle and then driven at 1.6 mA/cm$^2$. In FIG. 6B, the circle indicates a charge capacity, and the triangle indicates a discharge capacity. Further, the results of the charge-discharge tests of the all-solid secondary batteries of Comparative Examples 2 and 3 are shown in FIGS. 7A and 7B, respectively.

In the all-solid secondary battery of Comparative Example 2, the anode layer is a multi-layered structure cell manufactured without heat treatment. As shown in FIG. 7A, a short circuit occurred when the battery was driven at 1 mA/cm$^2$. Further, in the all-solid secondary battery of Comparative Example 3, as shown in FIG. 7B, a short circuit did not occur, but room-temperature interfacial resistance increased to 200 Ωcm$^2$ or more.

In contrast, the all-solid secondary battery of Example 1 shows a capacity retention rate even at a high current density of 1.6 mA/cm$^2$ at room temperature without the occurrence of a short circuit, as shown in FIG. 6A, and shows stable charge-discharge driving characteristics even after 30 cycles, as shown in FIG. 6B. This is because the interfacial electrochemical reaction kinetics were improved and Li plating/stripping was uniformly performed by the metal layer closest to the solid electrolyte layer prepared through heat treatment.

Evaluation Example 6: Charge-Discharge Test

Charge-discharge characteristics of the all-solid secondary batteries manufactured according to Example 1 and Comparative Example 4 were evaluated by the following charge-discharge test. The charge-discharge test was performed by putting a lithium symmetric cell into a thermostat at 60° C.

In the first cycle, the lithium symmetric cell was charged with a constant current of 0.1 mA/cm$^2$ until the battery voltage reached 4.2 V. Subsequently, the lithium symmetric cell was discharged with a constant current of 0.1 mA/cm$^2$ until the battery voltage reached 2.8 V.

In the second cycle, the lithium symmetric cell was charged with a constant current of 1 mA/cm$^2$ until the battery voltage reached 4.3 V. Subsequently, the lithium symmetric cell was discharged with a constant current of 1 mA/cm$^2$ until the battery voltage reached 2.8 V.

In the third cycle, the lithium symmetric cell was charged with a constant current of 1.6 mA/cm$^2$ until the battery voltage reached 4.3 V. Subsequently, the lithium symmetric cell was discharged with a constant current of 1.6 mA/cm$^2$ until the battery voltage reached 2.8 V.

A total of 30 cycles of charge and discharge were performed by repeatedly performing the third cycle.

Figure 8A:
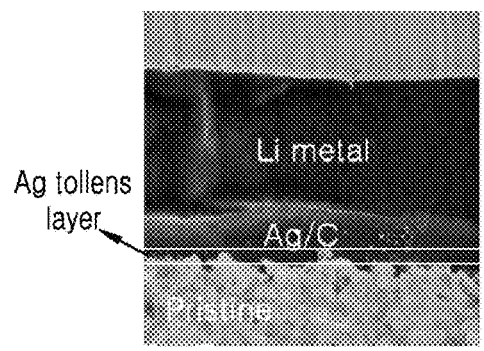
FIGS. 8A to 8C are SEM/EDX images showing the cross-sectional shape and composition of the all-solid secondary battery Example 1, including a solid electrolyte layer/Li containing Ag layer/nano Ag—C coating layer structure.
Figure 8B:
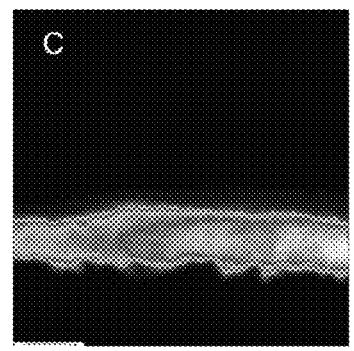
Figure 8C:
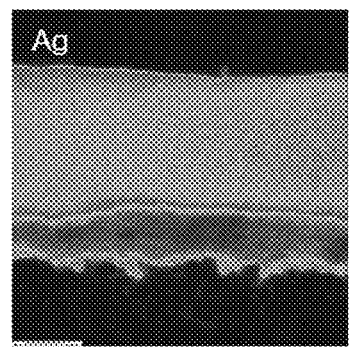

FIGS. 8A-8C illustrate the results of SEM/EDX analysis of the shape and composition of a cross-section of a solid electrolyte/Li-containing Ag layer/nano Ag—C coating layer structure in the all-solid secondary batteries using the structure of Example 1.

Figure 8D:
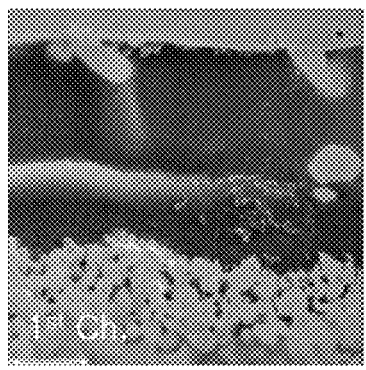
FIGS. 8D to 8F are SEM/EDX images showing the cross-sectional shape and composition of a solid electrolyte layer/Li containing Ag layer/nano Ag—C coating layer structure of Example 1, after charge of the solid electrolyte/nano Ag—C coating layer structure in an all-solid secondary battery.
Figure 8E:
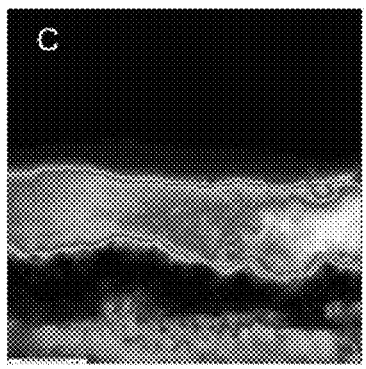
Figure 8F:
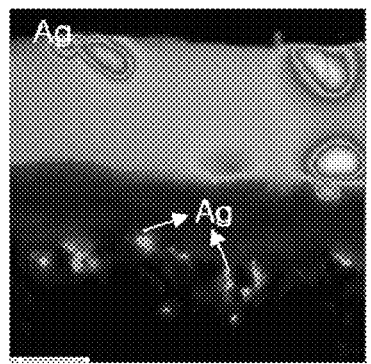
Figure 8G:
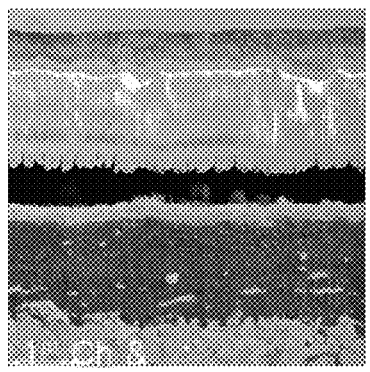
FIGS. 8G to 8I are SEM/EDX analysis images of the cross-sectional shape and composition of a solid electrolyte layer/Li containing Ag layer/nano Ag—C coating layer structure of Example 1, after discharge of the solid electrolyte/nano Ag—C coating layer structure in an all-solid secondary battery.
Figure 8H:
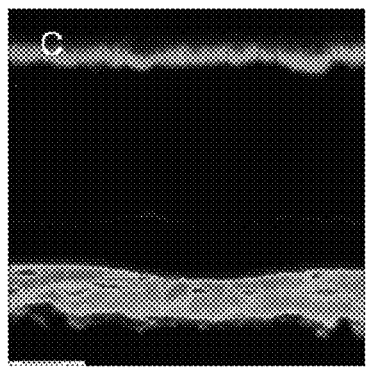
Figure 8I:
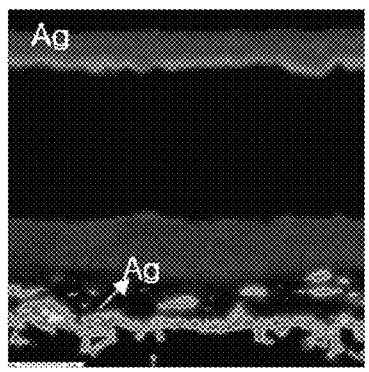

After charging was performed, the results of SEM/EDX analysis were examined, and the results thereof are shown in FIG. 8D-8F. Further, after discharging was performed, the results of SEM & EDS analysis were examined, and the results thereof are shown in FIG. 8G-8I.

Figures 9A, 9B, 9C:
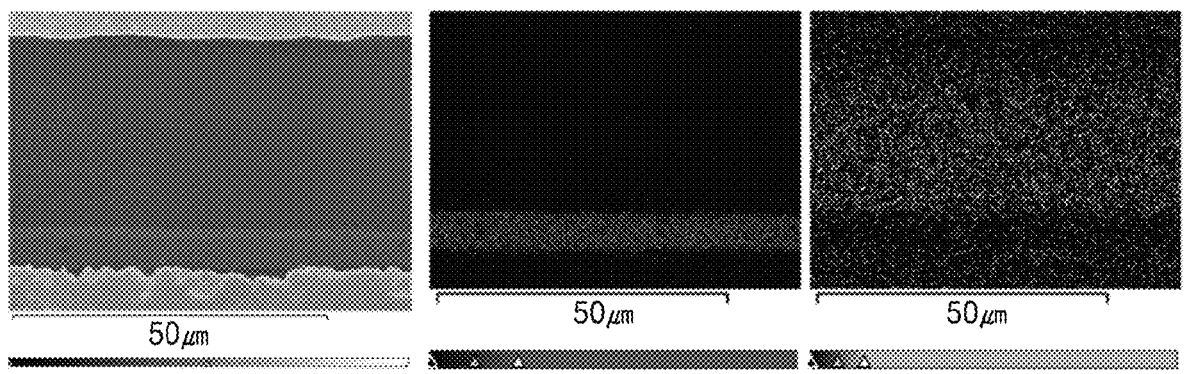
FIGS. 9A to 9C are SEM/EDX images showing the cross-sectional shape and composition of a solid electrolyte layer/nano Ag—C coating layer structure of Comparative Example 4, after charge of the solid electrolyte/nano Ag—C coating layer structure in an all-solid secondary battery.
Figures 9D, 9E, 9F:
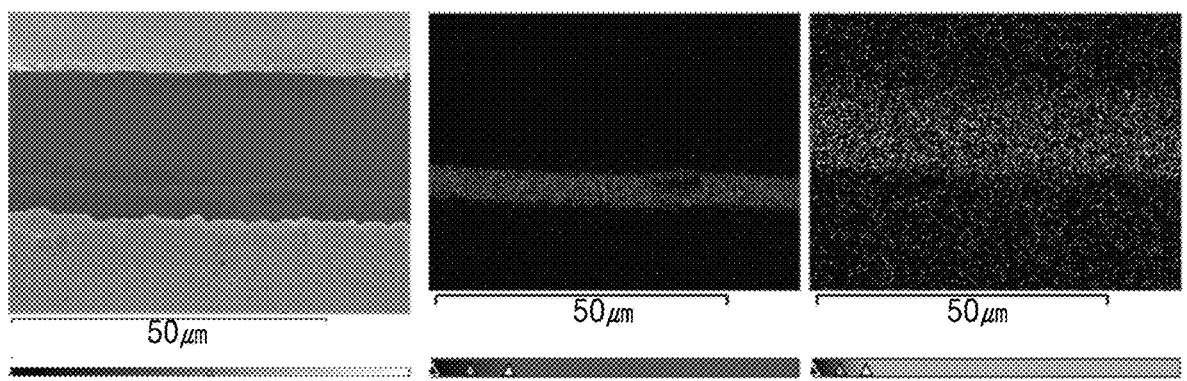
FIGS. 9D to 9F are SEM/EDX images showing the cross-sectional shape and composition of a solid electrolyte layer/nano Ag—C coating layer structure of Comparative Example 4, after discharge of the solid electrolyte/nano Ag—C coating layer structure in an all-solid secondary battery.

FIGS. 9A-9C illustrate the results of SEM/EDX analysis of the cross-sectional shape and composition of a solid electrolyte layer/nano Ag—C coating layer structure after charging the solid electrolyte layer/nano Ag—C coating layer structure of Comparative Example 4 in the all-solid secondary battery, and FIGS. 9D-9F illustrate the results of SEM/EDX analysis of the cross-sectional shape and composition of a solid electrolyte layer/nano Ag—C coating layer structure after discharging the solid electrolyte layer/nano Ag—C coating layer structure of Comparative Example 4 in the all-solid secondary battery.

Referring to this, it may be found that in the all-solid secondary battery having the structure of Example 1, the Ag layer is present on the surface of the solid electrolyte layer even after charging, and returns to the initial state after discharging.

In contrast, in the all-solid secondary battery using the solid electrolyte layer/nano Ag—C coating layer structure of Comparative Example 4, unlike the structure of Example 1, the above-described phenomenon did not occur, and silver was maintained at the same level after charging and discharging.

Evaluation Example 7: Porosity of Solid Electrolyte

Electron scanning microscope analysis of the electrolyte structure of Example 1 was performed.

As the electron scanning microscope, Magellan 400L (FEI company) was used. Pretreatment of a cross-section of a sample was performed by milling the cross-section thereof for 4 hours using CP2 of JEOL Corporation under the conditions of 6 kilovolts (kV) and 150 microamperes (μA). The electron scanning microscopy analysis was performed under a condition of 350 V.

The analysis results thereof are shown in Table 4 below. In Table 4, the first area of the solid electrolyte layer is a surface area directly adjacent to the first anode active material layer, the second area is a central area (area adjacent to the first area) of the solid electrolyte layer, the third area is an area of the solid electrolyte layer which is furthest away from the first anode active material layer and adjacent to the cathode active material layer. In Table 4, the porosity of the first area was calculated by image analysis based on the SEM photograph of FIG. 2B.

TABLE 4

| Class. | | Porosity (%) |
|---|---|---|
| Example 1 | First area of solid electrolyte layer | 20 |
| | Second area of solid electrolyte layer | <2 |
| | Third area of solid electrolyte layer | <2 |

According to an aspect, thermal bonding between a solid electrolyte layer and a first anode active material layer may be increased to reduce interfacial resistance, and an all-solid secondary battery may have a structure in which a first metal is dispersed in the surface of the solid electrolyte layer and decreases from the surface in the direction of a current collector to improve current uniformity during charging and discharging. Further, since interfacial resistance between the solid electrolyte layer and the anode layer may be reduced, internal resistance of the battery may be reduced, thereby manufacturing an all-solid secondary battery having improved cycle characteristics and lifetime characteristics.

It should be understood that embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An all-solid secondary battery comprising:
   a cathode layer comprising a cathode active material layer;
   an anode layer; and
   a solid electrolyte layer between the cathode layer and the anode layer, the solid electrolyte layer comprising a solid electrolyte,
   wherein the anode layer comprises
      an anode current collector,
      a first anode active material layer in contact with the solid electrolyte layer, and
      a second anode active material layer between the anode current collector and the first anode active material layer,
   wherein the first anode active material layer is a lithium-containing first metal layer comprising lithium and a first metal,
   wherein the second anode active material layer comprises
      a carbon-containing anode active material, or
      a carbon-containing anode active material and a second metal, and
   wherein
   the solid electrolyte layer has an outermost surface adjacent to the first anode active material layer and an opposite second surface adjacent to the cathode layer, the solid electrolyte layer having a porous portion extending from the outermost surface in a direction towards the opposite second surface, and the porous portion having a porosity of 1 percent to 20 percent, and
   the first metal of the lithium-containing first metal layer is present in a pore of the porous portion of the solid electrolyte layer and has a particle size of about 10 nanometers to about 900 nanometers,
   wherein, the solid electrolyte layer comprises lithium, and a content of lithium of the solid electrolyte layer in an area within a 1 micrometer distance from the outermost surface of the solid electrolyte layer adjacent to the first anode active material layer is depleted by about 5 atomic percent to about 20 atomic percent, based on a total lithium content of the solid electrolyte.

2. The all-solid secondary battery of claim 1, a thickness of the porous portion of the solid electrolyte layer is about 1% to about 50% of the total thickness of the solid electrolyte layer extending from the outermost surface of the solid electrolyte layer.

3. The all-solid secondary battery of claim 2, wherein the porous portion of the solid electrolyte layer is an area within about 1 micrometer from the outermost surface of the solid electrolyte layer.

4. The all-solid secondary battery of claim 1, wherein the first metal and the second metal independently comprise indium, silicon, gallium, tin, aluminum, titanium, zirconium, niobium, germanium, antimony, bismuth, gold, platinum, palladium, magnesium, silver, zinc, or a combination thereof.

5. The all-solid secondary battery of claim 1, wherein the lithium-containing first metal layer comprises a lithium-first metal alloy interlayer adjacent to the solid electrolyte layer and a first metal layer adjacent to the lithium-first metal alloy interlayer, and
wherein the lithium-first metal alloy interlayer has a thickness of 7 micrometers or less.

6. The all-solid secondary battery of claim 5, wherein the first metal in the lithium-first metal interlayer comprises indium, silicon, gallium, tin, aluminum, titanium, zirconium, niobium, germanium, antimony, bismuth, gold, platinum, palladium, magnesium, silver, zinc, or a combination thereof.

7. The all-solid secondary battery of claim 1, wherein, the first metal is uniformly dispersed in porous portion of the solid electrolyte layer.

8. The all-solid secondary battery of claim 1, wherein the first anode active material layer further comprises a third metal in an area adjacent to the solid electrolyte layer, and
a content of the third metal is 30 atomic percent or less, based on the total atomic weight of the first anode active material layer.

9. The all-solid secondary battery of claim 8, wherein the third metal comprises lanthanum, titanium, zirconium, or a combination thereof.

10. The all-solid secondary battery of claim 1, wherein the first anode active material layer does not comprise a binder, and
the second anode active material layer comprises a binder.

11. The all-solid secondary battery of claim 1, wherein the carbon-containing anode active material has a particle form, and
the carbon-containing anode active material has a particle size of about 5 micrometers or less.

12. The all-solid secondary battery of claim 1, wherein the carbon-containing anode active material comprises amorphous carbon.

13. The all-solid secondary battery of claim 1, wherein
the second anode active material layer comprises a composite comprising first particles comprising amorphous carbon and second particles comprising a second metal, and
wherein a content of the second particles is about 1 weight percent to about 60 weight percent based on a total weight of the composite.

14. The all-solid secondary battery of claim 1, wherein each of a thickness of the first anode active material layer and a thickness of the second anode active material layer are 50% or less of a thickness of the cathode active material layer, and
wherein the thickness of the first anode active material layer is about 1 micrometer to about 10 micrometers, and the thickness of the second anode active material layer is about 10 nanometers to about 10 micrometers.

15. The all-solid secondary battery of claim 1, wherein a thickness of the first anode active material layer is less than a thickness of the second anode active material layer.

16. The all-solid secondary battery of claim 1, further comprising a third anode active material layer
between the anode current collector and the second anode active material layer, or
between the first anode active material layer and the second anode active material layer, or
between the anode current collector and the second anode active material layer and between the first anode active material layer and the second anode active material layer,
wherein the third anode active material layer is a metal layer comprising lithium or a lithium alloy.

17. The all-solid secondary battery of claim 1, wherein the anode current collector, the first anode active material layer, the second anode active material layer, and an area therebetween are free of lithium, and do not comprise lithium in an initial state or a post-discharge state.

18. The all-solid secondary battery of claim 1, wherein the solid electrolyte is an oxide-containing solid electrolyte or a sulfide-containing solid electrolyte.

19. The all-solid secondary battery of claim 18, wherein the oxide-containing solid electrolyte comprises $Li_{1+x+y}Al_xTi_{2-x}Si_yP_{3-y}O_{12}$ wherein $0<x<2$, $0\leq y<3$, $Li_3PO_4$, $Li_xTi_y(PO_4)_3$ wherein $0<x<2$ and $0<y<3$, $Li_xAl_yTi_z(PO_4)_3$ wherein $0<x<2$, $0<y<1$ and $0<z<3$, $Li_{1+x+y}(Al_aGa_{1-a})_x(Ti_bGe_{1-b})_{2-x}Si_yP_{3-y}O_{12}$ wherein $0\leq x\leq 1$, $0\leq y\leq 1$, $0\leq a\leq 1$, and $0\leq b\leq 1$, $Li_xLa_yTiO_3$ wherein $0<x<2$ and $0<y<3$, $Li_2O$, $LiOH$, $Li_2CO_3$, $LiAlO_2$, $Li_2O$—$Al_2O$—$SiO_2$—$P_2O_5$—$TiO_2$—$GeO_2$, $Li_{3+x}La_3M_2O_{12}$ wherein M is Te, Nb, or Zr, and $0\leq x\leq 10$, or a combination thereof.

20. The all-solid secondary battery of claim 18, wherein the oxide-containing solid electrolyte is a garnet-type solid electrolyte comprising $Li_7La_3Zr_2O_{12}$, $Li_{3+x}La_3Zr_{2-a}M_aO_{12}$ wherein M=Ga, W, Nb, Ta, or Al and $0\leq x\leq 10$, or a combination thereof.

21. The all-solid secondary battery of claim 18, wherein the sulfide-containing solid electrolyte comprises $Li_2S$—$P_2S_5$, $Li_2S$—$P_2S_5$—LiX wherein X is a halogen, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ wherein m and n are each independently a positive number, and Z is Ge, Zn, Ga, or a combination thereof, $Li_2S$—$GeS_2$, $Li_2S$—$SiS_2$—$Li_3PO_4$, $Li_2S$—$SiS_2$—$Li_pMO_q$ wherein p and q are each independently a positive number, and M is P, Si, Ge, B, Al, Ga, In, or a combination thereof, $Li_{7-x}PS_{6-x}Cl_x$ wherein $0\leq x\leq 2$, $Li_{7-x}PS_{6-x}Br_x$ wherein $0\leq x\leq 2$, $Li_{7-x}PS_{6-x}I_x$ wherein $0\leq x\leq 2$, or a combination thereof.

22. The all-solid secondary battery of claim 18, wherein the sulfide-containing solid electrolyte is an argyrodite-type solid electrolyte comprising $Li_{7-x}PS_{6-x}Cl_x$ wherein $0\leq x\leq 2$, $Li_{7-x}PS_{6-x}Br_x$ wherein $0\leq x\leq 2$, $Li_{7-x}PS_{6-x}I_x$ wherein $0\leq x\leq 2$, or a combination thereof.

23. A method of manufacturing the all-solid secondary battery of claim 1, the method comprising:
providing the solid electrolyte layer;
disposing a first composition comprising a first metal salt, a C1 to C10 aliphatic aldehyde, and sodium hydroxide on a first surface of the solid electrolyte layer to form a first metal layer;
heat-treating the first metal layer at about 100° C. to about 600° C. to form the first anode active material layer, which is the lithium-containing first metal layer including lithium and the first metal;
coating a second composition on the first anode active material layer, wherein the second composition comprises a carbon-containing anode compound or including a carbon-containing anode compound and the second metal;

drying the second composition to form the second anode active material layer, wherein the second anode active material layer comprises
the carbon-containing anode active material, or
the carbon-containing anode active material and the second metal;
providing the anode current collector on the second anode active material layer to prepare the anode layer; and
providing the cathode active material layer and the cathode current collector on a second surface of the solid electrolyte layer to prepare the cathode layer on the solid electrolyte layer and to provide the all-solid secondary battery.

24. The method of claim 23, wherein the disposing of the first composition comprises applying the first composition onto the surface of the solid electrolyte layer, wherein the applying comprises solution infiltration, dipping, spin coating, drop casting, spray coating, spray pyrolysis, roll coating, dip coating, flow coating, a doctor blade method, dispensing, inkjet printing, offset printing, screen printing, pad printing, gravure printing, flexoprinting, or lithoprinting.

25. The method of claim 23, wherein the first metal salt comprises indium, silicon, gallium, tin, aluminum, titanium, zirconium, niobium, germanium, antimony, bismuth, gold, platinum, palladium, magnesium, palladium, silver, zinc, or a combination thereof.

26. The method of claim 23, wherein the first metal layer is formed by a Tollens reaction using a mixture comprising silver nitrate, formaldehyde, and sodium hydroxide.

27. The method of claim 23, wherein the second metal comprises indium, silicon, gallium, tin, aluminum, titanium, zirconium, niobium, germanium, antimony, bismuth, gold, platinum, palladium, magnesium, palladium, silver, zinc, or a combination thereof.

28. The all-solid secondary battery of claim 1, wherein the first anode active material layer has a thickness of about 3 micrometers to about 7 micrometers.

29. The all-solid secondary battery of claim 1, wherein an atomic ratio of lithium to the first metal in the lithium-containing layer is about 1:1 to about 10:1.

* * * * *